US011260739B2

(12) United States Patent
Hennessy et al.

(10) Patent No.: US 11,260,739 B2
(45) Date of Patent: Mar. 1, 2022

(54) ENERGY HARVESTING CLUTCH CONTROL ASSEMBLY, VALVE ASSEMBLY, AND ELECTRICALLY ACTUATED CLUTCH

(71) Applicant: Horton, Inc., Roseville, MN (US)

(72) Inventors: David R. Hennessy, Burnsville, MN (US); Carter Brown, Minneapolis, MN (US); Gavin Dauwalter, Shoreview, MN (US); Adam Gerenz, St. Paul, MN (US); Patrick Swords, Minneapolis, MN (US); Gregory Stephen Mowry, Burnsville, MN (US); Ali Abdullah Alsagoor, St. Paul, MN (US); Brian Nguyen, Watertown, MN (US); Alexander John Zaic, Blaine, MN (US); Joseph Peter Zinke, Arvada, CO (US)

(73) Assignee: HORTON, INC., Roseville, MN (US)

( * ) Notice: Subject to any disclaimer, the term of this patent is extended or adjusted under 35 U.S.C. 154(b) by 0 days.

(21) Appl. No.: 17/050,928

(22) PCT Filed: May 2, 2019

(86) PCT No.: PCT/US2019/030338
§ 371 (c)(1),
(2) Date: Oct. 27, 2020

(87) PCT Pub. No.: WO2019/213359
PCT Pub. Date: Nov. 7, 2019

(65) Prior Publication Data
US 2021/0138888 A1 May 13, 2021

Related U.S. Application Data

(60) Provisional application No. 62/837,969, filed on Apr. 24, 2019, provisional application No. 62/665,606, filed on May 2, 2018.

(51) Int. Cl.
F16D 35/02 (2006.01)
B60K 6/26 (2007.10)
(Continued)

(52) U.S. Cl.
CPC ............... B60K 6/26 (2013.01); F16D 27/00 (2013.01); F16D 35/024 (2013.01); F16D 27/02 (2013.01);
(Continued)

(58) Field of Classification Search
CPC .......... F16D 2121/20; F16D 2027/001; F16D 27/02; F16D 35/024
See application file for complete search history.

(56) References Cited

U.S. PATENT DOCUMENTS 4,355,710 A 10/1982 Schilling
4,706,792 A 11/1987 Göb
(Continued)

FOREIGN PATENT DOCUMENTS

CN 104454116 A 3/2015
DE 19741073 A1 3/1999
(Continued)

OTHER PUBLICATIONS

International Search Report and Written Opinion in corresponding PCT Application PCT/US2019/030338, dated Aug. 13, 2019.
(Continued)

Primary Examiner — Stacey A Fluhart
(74) Attorney, Agent, or Firm — Westman, Champlin & Koehler, P.A.

(57) ABSTRACT

A clutch assembly includes a clutch mechanism and an energy harvesting device. The clutch mechanism includes an input member, an output member, and an actuating mechanism to govern selective torque transmission from the input member to the output member. The actuating mechanism is (Continued)

powered by electrical current. The energy harvesting device is electrically connected to the actuating mechanism, and the energy harvesting device is configured to scavenge available energy to generate the electrical current that powers the actuating mechanism.

22 Claims, 17 Drawing Sheets

(51) Int. Cl.
    *F16D 27/00*     (2006.01)
    *F16D 27/02*     (2006.01)
    *F16D 121/20*     (2012.01)

(52) U.S. Cl.
    CPC .... *F16D 2027/001* (2013.01); *F16D 2121/20* (2013.01)

(56) References Cited

U.S. PATENT DOCUMENTS

| | | |
|---|---|---|
| 5,025,906 A | 6/1991 | O'Neil et al. |
| 5,030,865 A | 7/1991 | Rockey et al. |
| 5,523,638 A | 6/1996 | Albrecht et al. |
| 5,627,422 A | 5/1997 | Boggs, III et al. |
| 5,821,658 A | 10/1998 | Boggs, III |
| 6,419,064 B1 | 7/2002 | Krammer |
| 6,632,252 B1 | 10/2003 | Kyrtsos |
| 6,695,113 B2 | 2/2004 | Lutz |
| 6,752,251 B2 | 6/2004 | May et al. |
| 7,178,648 B2 | 2/2007 | Bamum et al. |
| 7,385,503 B1 | 6/2008 | Wells et al. |
| 7,419,040 B2 | 9/2008 | Shiozaki et al. |
| 7,628,262 B2 | 12/2009 | Bamum et al. |
| 7,854,307 B2 | 12/2010 | Hennessy et al. |
| 7,938,240 B2 | 5/2011 | Hennessy et al. |
| 7,946,400 B2 | 5/2011 | Hennessy et al. |
| 8,011,255 B2 | 9/2011 | Arms et al. |
| 8,030,807 B2 | 10/2011 | Gieras et al. |
| 8,100,241 B2 | 1/2012 | Hennessy et al. |
| 8,222,775 B2 | 7/2012 | Gieras et al. |
| 8,759,993 B2 | 6/2014 | Coonrod et al. |
| 8,860,234 B2 | 10/2014 | Hoffman et al. |
| 8,881,881 B2 | 11/2014 | Gevers et al. |
| 8,887,888 B2 | 11/2014 | Hennessy et al. |
| 9,132,838 B2 | 9/2015 | Baker |
| 9,328,780 B2 | 5/2016 | Buchholz et al. |
| 9,397,588 B2 | 7/2016 | Coonrod et al. |
| 9,464,697 B2 | 10/2016 | Antchak et al. |
| 11,081,977 B2 | 8/2021 | Toshiyoshi et al. |
| 2002/0014804 A1 | 2/2002 | Nelson et al. |
| 2006/0237959 A1* | 10/2006 | Dimig .................. B60T 13/02 280/776 |
| 2010/0186408 A1* | 7/2010 | Rose .................. F16H 61/4096 60/629 |
| 2011/0209962 A1 | 9/2011 | Hennessy et al. |
| 2012/0223262 A1 | 9/2012 | Parker et al. |
| 2016/0169235 A1 | 6/2016 | Ignatovich |
| 2017/0259764 A1 | 9/2017 | Da Silva Carvalho et al. |

FOREIGN PATENT DOCUMENTS

| | | |
|---|---|---|
| EP | 2072292 A1 | 6/2009 |
| WO | 2012024497 A2 | 2/2012 |
| WO | 2014004335 A1 | 1/2014 |
| WO | 2014047430 A1 | 3/2014 |
| WO | 2014158397 A1 | 10/2014 |
| WO | 2014159374 A1 | 10/2014 |
| WO | 2017062328 A1 | 4/2017 |
| WO | 2017062330 A1 | 4/2017 |
| WO | 2018004833 A1 | 1/2018 |
| WO | 2018057276 A2 | 3/2018 |
| WO | 2018144428 A1 | 8/2018 |

OTHER PUBLICATIONS

Abinnas et al., "0.8V Nanogenerator for Mechanical Energy Harvesting Using Bismuth Titanate-PDMS Nanocomposite", Applied Surface Science, 2017, pp. 362-368, vol. 418.
Ferrotec Nord Corporation. (2018). Retrieved from ferrotecnordcorporation: https://ferrotecnordcorporation.wordpress.com/2016/03/17/thermoelectric-power-generator-and-its-types/, 1 page.
Marlow. (archived Dec. 16, 2017). Retrieved from https://web.archive.org/web/20171216224752/http://www.marlow.com/power-generators/energy-harvesting-kits.html, 1 page.
Micropelt. (2014). TGP-651 Micropelt Thermogenerator. Retrieved from http://www.micropelt.com/fileadmin/user_upload/_PDF_TGP_UK.pdf, 13 pages.
Midé. (Apr. 19, 2018). Piezo Power Estimator for Energy Harvesting. Retrieved from Midé Technology Corporation Website: https://www.mide.com/pages/piezo-power-calculator-for-energy-harvesting, 1 page.
Midé. (Apr. 19, 2018). Home Page. Retrieved from Midé Technology Corporation Website: https://www.mide.com/, 1 page.
Midé. (Jan. 27, 2017). PPA Prdocuts Datasheet & User Manual, 70 pages.
SparkFun. (May 1, 2018). SparkFun Energy Harvester Breakout—LTC3588. Retrieved from SparkFun: https://www.sparkfun.com/products/9946, 1 page.
Digi-Key (May 1, 2018). Tadiran Batteries TL-2450/P. Retrieved from Digi-Key: https://www.digikey.com/product-detail/en/tadiranbatteries/TL-2450-P/439-1039-ND/1114863, 1 page.
Wang et al., "Wideband Electromagnetic Energy Harvesting from a Rotating Wheel", Intechopen, 2012, pp. 161-182.
Supplementary European Search Report in corresponding European Patent Application No. 19796047 dated Jan. 5, 2022.

* cited by examiner

ENERGY HARVESTING CLUTCH CONTROL ASSEMBLY, VALVE ASSEMBLY, AND ELECTRICALLY ACTUATED CLUTCH

CROSS-REFERENCE TO RELATED APPLICATION(S)

This Application is a Section 371 National Stage Application of International Application No. PCT/US2019/030338, filed May 2, 2019 and published as WO2019/213359A1 on Nov. 7, 2019, in English. This application further claims priority to U.S. Provisional Patent Application Ser. Nos. 62/665,606 (filed May 2, 2018) and 62/837,969 (filed Apr. 24, 2019). The contents of each priority document are hereby incorporated by reference in their entirety

FIELD

Embodiments of the present invention relate generally to clutches, energy harvesting assemblies and clutches utilizing such energy harvesting assemblies, as well as associated methods.

BACKGROUND

Variable speed clutches are used in a variety of applications for controlling an output speed of rotating equipment. For instance, viscous clutches are used in a wide variety of automotive fan drive applications, among other uses. These clutches typically employ relatively thick silicone oil (more generally called shear fluid or viscous fluid) for the selective transmission of torque between two rotatable components. It is possible to engage or disengage the clutch by selectively allowing the oil into and out of a working area of the clutch located between input and output members (e.g., between an input rotor and an output housing). Moreover, the output speed is related to the proportion of oil that is in working area at any given time. A valve is used to control the flow of the oil in the working area between the input and the output. Typically, these viscous clutches further utilize a fixed dynamic pumping system that continuously pumps the oil from the working area back to the storage area. Recent clutch designs have been employed that allow the oil to be stored in a reservoir attached to an input rotor while the clutch is disengaged, in order to keep kinetic energy available in the oil to allow rapid engagement of the clutch from the off condition. This also allows the clutch to have a very low output speed (e.g., output fan speed) while the valve is positioned to obstruct oil flow into the working area.

However, prior art viscous clutches generally utilize either a bimetal valve actuation system (for example, U.S. Pat. No. 4,706,792) or an electromagnetic coil (or solenoid) to control a valve element via a magnetic flux circuit (for example, PCT International Application Publication No. WO2014/159374). Bimetal control elements operate based on the thermal conditions affecting the shape of the bimetallic element and are unable to be actively controlled with signals from a controller (e.g., engine control unit), which greatly limits control options. Bimetal controls may also exhibit significant lag time between thermal conditions and valve actuation. Moreover, bimetal controls may perform poorly in blower-type applications, for instance, in which relatively hot air is ejected from an engine compartment rather than cool air being pulled into the engine compartment. Electromagnetic coils can be used to control the valve in a more versatile manner than bimetal controls, but such coils tend to have relatively high mass and significant power requirements. Such electromagnetic coils convert electrical energy to magnetic flux, and that magnetic flux is then transmitted along a flux circuit to control a magnetically-actuated valve element armature. The flux circuit can be relatively large, having to pass mostly or entirely through certain clutch components, sometimes via special flux-conductive inserts (that may be cumbersome to fabricate and assembly within the clutch, and that may present risks of shear fluid leakage), and over relatively large distances. Such prior art flux circuits generally have a toroidal shape that surrounds the rotational axis of the clutch and extends around an entire circumference of the clutch. Air gaps in magnetic flux circuits tend to increase power requirements for the coil, yet such air gaps are generally necessary to transmit magnetic flux along the flux circuit between components that rotate relative to one another. Additionally, electromagnetic coils are typically rotationally secured with a tether, bracket or the like, to allow power cables to be attached to the coil. But such cables are at risk of failure, such as when a tether fails or an engine belt or fan fails and severs the power cable.

SUMMARY

In one aspect, a clutch assembly includes a clutch mechanism and an energy harvesting device. The clutch mechanism includes an input member, an output member, and an actuating mechanism to govern selective torque transmission from the input member to the output member. The actuating mechanism is powered by electrical current. The energy harvesting device is electrically connected to the actuating mechanism, and the energy harvesting device is configured to scavenge available energy to generate the electrical current that powers the actuating mechanism.

In another aspect, a method of using a clutch to selectively transfer torque includes scavenging available energy to generate electrical power, transmitting the electrical power across a rotary electrical interface, transmitting the electrical power though a rotatable portion of the clutch to an actuating mechanism of the clutch, and activating the actuating mechanism to control torque transfer between an input and an output of the clutch. The available energy is scavenged by an energy harvester located adjacent to the clutch, and the actuating mechanism is electrically powered by the scavenged electrical power.

In another aspect, a valve assembly for a viscous clutch mechanism having a reservoir with a bore, the reservoir being rotationally fixed to an input of the viscous clutch mechanism to rotate at all times with the input about an axis of rotation whenever there is torque input to the viscous clutch mechanism includes a linear actuator rotationally fixed relative to the reservoir and configured to rotate about the axis of rotation whenever there is torque input to the viscous clutch mechanism, the linear actuator being electrically powered by electrical current transmitted through the input of the viscous clutch mechanism, and a needle assembly including a plunger and a valve plug, the plunger operatively engaged to the linear actuator and the valve plug carried by the plunger such that actuation of the linear actuator translates the plunger and the valve plug. The valve plug is selectively movable relative to the bore of the reservoir to regulate flow of shear fluid through the bore.

In another aspect, a valve assembly for a viscous clutch mechanism having a reservoir with a bore, the reservoir being rotationally fixed to an input of the viscous clutch mechanism to rotate at all times with the input about an axis of rotation whenever there is torque input to the viscous clutch mechanism includes an electromagnetic coil rotationally fixed relative to the reservoir and configured to rotate about the axis of rotation whenever there is torque input to the viscous clutch mechanism, the electromagnetic coil being electrically powered by electrical current transmitted through the input of the viscous clutch mechanism, a magnetic flux guide adjoining the electromagnetic coil and rotationally fixed relative to the reservoir and the electromagnetic coil, an armature positioned adjacent to the electromagnetic coil, the armature positioned such that a magnetic field generated by the electromagnetic coil directly acts upon the armature to move the armature, and a reed valve positioned adjacent to the armature. Movement of the armature pivots the reed valve relative to the bore of the reservoir.

In yet another aspect, a method of actuating a viscous clutch mechanism having an axis of rotation, an input and an output includes rotating a valve device relative to the axis of rotation, where the valve device is rotationally fixed to either the input or the output, and where the valve device rotates at either an input speed of the input or an output speed of the output during operation of the viscous clutch mechanism, transmitting electrical current though either the input or the output to the valve device, and actuating the valve device to control flow of a shear fluid within the viscous clutch mechanism to in turn control torque transfer between the input and the output.

The present summary is provided only by way of example, and not limitation. Other aspects of the present invention will be appreciated in view of the entirety of the present disclosure, including the entire text, claims and accompanying figures.

Figure 1:
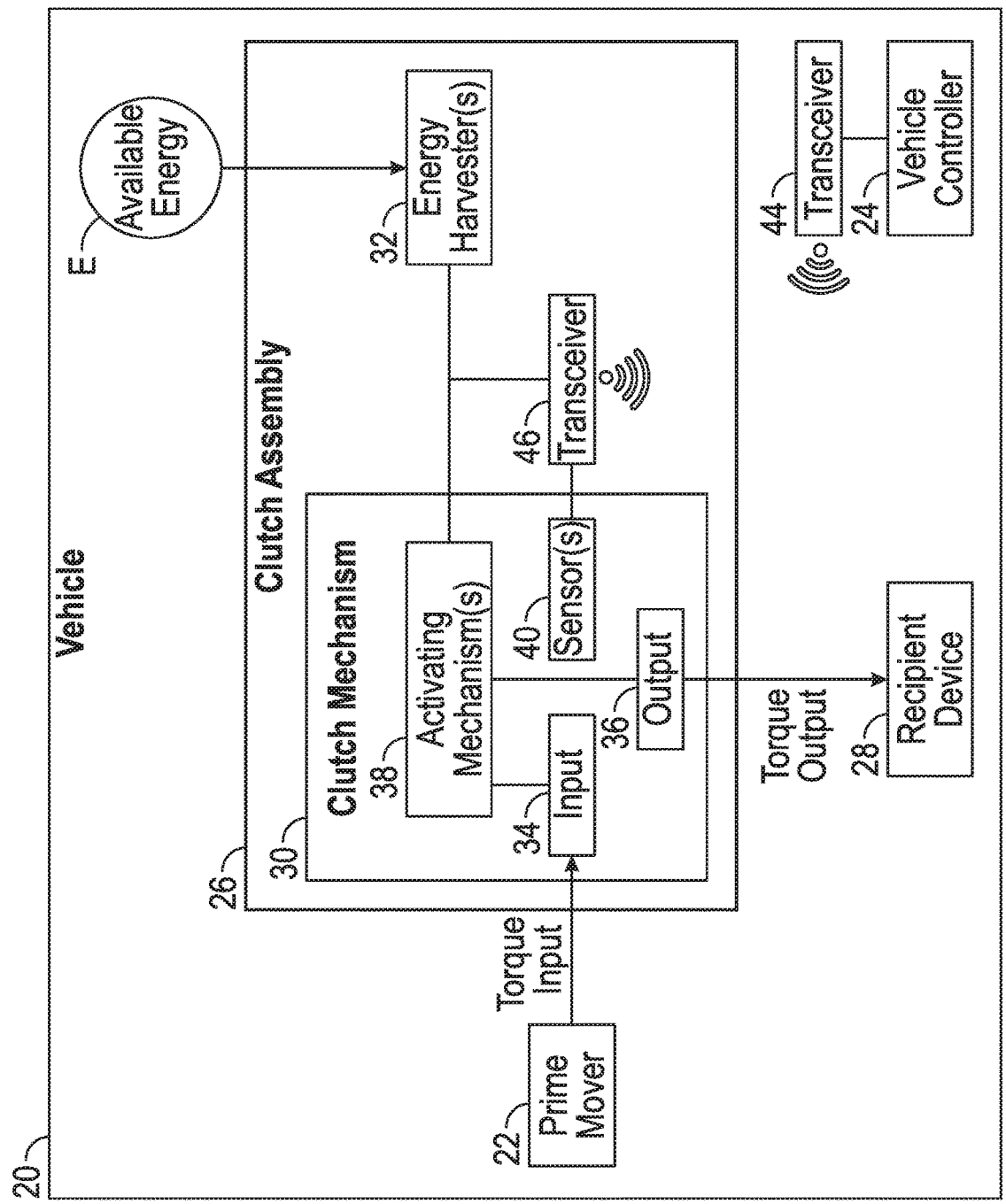
FIG. 1 is a schematic block diagram of an embodiment of a vehicle with a clutch assembly.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention and the claims. The figures may not be drawn to scale, and applications and embodiments of the present invention may include features, steps and/or components not specifically shown in the drawings.

DETAILED DESCRIPTION OF ILLUSTRATIVE EMBODIMENTS

State of the art viscous clutches utilize an electromagnetic valve system that is controlled by a stationary (that is, rotationally fixed) electromagnet. The electromagnetic valve system is useful because it allows for power to be moved into one or more rotatable portions of the clutch from a stationary portion of the clutch in the form of magnetic flux transmitted along a flux circuit. This provides a non-contact form of (magnetic) power transfer, because the magnetic flux circuit has air gaps between components that can rotate relative one another. State of the art viscous clutches use a valve element that is spring biased. The electromagnet counteracts the spring and moves an armature and the associated valve element from a default state (e.g., an open state) to another state (e.g., a closed state). In order to control a volume of a shear fluid in a working chamber of the clutch, and therefore an output speed of the clutch, the valve is moved between the two states, typically at a predefined frequency using a pulse width modulation (PWM) scheme. This allows for closed loop speed control between an input and an output of the clutch. Because the magnetic flux transmitted along the flux circuit has to cross several air gaps (typically four or more air gaps), the amount of electrical power required by the electromagnet (e.g., approximately 25 Watts or more) is relatively high compared to the amount of mechanical power required to move the valve element (this can be on the order of 100 times or more depending on the configuration). The relatively large amount of necessary magnetic power requires a substantial electromagnet, which in turn requires a substantial amount of electrical power to generate necessary magnetic flux. Because the electromagnet is typically made of copper, it is relatively heavy and expensive. The electrical power required by the electromagnet is generally applied by a cable or wire connection from an external power source. The cable or wire connection is also sometimes used to provide a speed signal from a sensor back to the controller. The current output speed signal provides useful information for control purposes, because it can be used to compare the measured output speed to both a desired output speed as well to as a measured input speed.

It is also generally desirable to make mechanical components on most pieces of equipment lighter and more compact.

In general, an example clutch system or assembly contemplated in the present disclosure can utilize one or more actuation mechanisms (for example, valves) that are sized directly by the requirements for activating the actuation mechanism(s), or otherwise have reduced electric power requirements compared to clutches with large, rotationally-fixed electromagnetic coils and large magnetic flux circuits that transmit magnetic flux (rather than electricity) between and through components that rotate relative to each other during operation. For example, in a viscous clutch assembly, a suitable valve actuation mechanism could be in the form of a direct acting solenoid, a small actuator (for example, a linear actuator) that is self-locking (or otherwise substantially positionally-stable) when unpowered, or another type of self-contained valve that converts supplied electrical energy to mechanical movement. The valve actuation mechanism can be sized based on the requirements for moving a valve element to control flow of a shear fluid. Each electrically-powered actuation mechanism (e.g., valve) can be located on or within the clutch, and, for instance, can be carried by either the input member of the clutch or the output member of the clutch, to co-rotate with the input member or output member at all times at either the input speed or output speed (e.g., 3000 RPM or more). In some viscous clutch embodiments, valve(s) can be rotationally fixed relative to a reservoir that holds a supply of the shear fluid. Electrical current is supplied through a rotating portion of the clutch (e.g., through the input member or the output member) to the actuation mechanism(s). Because the power required for a direct actuating valve or other actuating mechanism is relatively small, the overall clutch assembly can be made smaller and lighter. For instance, a direct acting solenoid valve can have an electromagnetic coil surrounding a core with an armature controlling a valve element that is separated from the core by as few as one or two very small air gaps, and with all the magnetic flux being self-contained within the valve actuator (for instance, without a flux circuit passing outside the valve actuator). In other example embodiments, a small electromagnetic coil is provided on either the rotatable input or output, rather than as a separate stationary (rotationally fixed) component, that generates magnetic flux locally to actuate the valve via flux circuit that does not pass through large portions of the input or output members and even without passing through any rotationally stationary components. Of course, numerous other valve configurations are possible.

If the valve(s) or other actuating mechanism(s) is small enough and require relatively little power, enough energy can be scavenged during operation of the clutch to power the valve, thereby eliminating the need for a separate, rotationally stationary, externally-powered electromagnet connected to the valve via a large flux circuit with many air gaps, for example. Energy harvesting devices are useful in reducing the dependence of remote processes on wired power or batteries, and such energy harvesting devices can have no wired electrical connection external to a clutch assembly of which it is part. The presently disclosed system can harvest (or scavenge) available energy in the form of heat, vibration, temperature differentials, light, fluid movement, etc. and utilize the harvested energy to control the actuating mechanism (e.g., valve) in the clutch for speed control. The available energy being harvested can consist of ambient and/or waste energy present at or near the clutch, such as thermal, kinetic, or other forms of available ambient and/or waste energy. In other words, embodiments of the clutch assembly can be energy self-sufficient.

The present application is based on and claims the benefit of U.S. provisional patent application Ser. No. 62/665,606, filed May 2, 2018, and U.S. provisional patent application Ser. No. 62/837,969, filed Apr. 24, 2019, the contents of both of which are hereby incorporated by reference in their entireties.

FIG. 1 is a schematic block diagram of an embodiment of a vehicle 20 that includes a prime mover 22, a vehicle controller 24, a clutch assembly 26, and a recipient device 28. The vehicle 20 can be an automobile, truck, construction equipment, agricultural equipment, mining equipment, or another type of vehicle. It should be noted that the vehicle 20 can include additional components not specifically shown in FIG. 1, such as wheels, a frame or chassis, and the like.

The prime mover 22 is a device capable of generating torque that is provided as a torque input to the clutch assembly 26. The prime mover 22 can be an internal combustion engine, an electric motor, a gas turbine engine, or the like. Although not specifically shown in FIG. 1, the prime mover 22 can include a suitable drivetrain (e.g., gearing, shafts, belts, chains, and the like) to convey torque to the clutch assembly 26, or such a suitable drivetrain can be provided in addition to components of the prime mover 22.

The vehicle controller 24 can be an electronic controller capable of governing the operation of one or more components of the vehicle 20. For example, in one embodiment, the vehicle controller 24 can be an onboard computer that governs essentially all sub-systems of the vehicle 20. In another embodiment, the vehicle controller 24 can be an engine controller for the prime mover 22, and can further control other things such as the clutch assembly 26. In still other embodiments, the vehicle controller 24 can be a dedicated clutch controller that governs the operation of the clutch assembly 26.

The clutch assembly 26 can include a clutch mechanism 30 and one or more energy harvesters (or energy harvesting devices) 32. The clutch mechanism 30 includes an input 34, and output 36, and one or more actuating mechanisms 38 (e.g., valve(s), pump(s), etc.). The input 34 accepts the torque input from the prime mover 22. The output 36 delivers torque output to the recipient device 28. The actuating mechanism(s) 38 control engagement of the clutch mechanism 30, that is, the actuating mechanism(s) 38 can selectively control torque transmission from the input 34 to the output 36. The clutch mechanism 30 can have any suitable configuration for desired applications, such as an on/off friction clutch, a fully variably output speed viscous clutch, or other suitable configuration. The clutch mechanism 30 can optionally further include one or more sensors 40, such as output speed and/or input speed sensors, a temperature sensor, or the like. In some embodiments, the clutch assembly 26 can be configured as a stand-alone package, that is, the clutch assembly 26 can be assembled as a discrete unit that can be mechanically installed in the vehicle without requiring electrical or fuel line connections to be made and without requiring sub-components of the clutch assembly 26 to be separately installed. In some prior art clutch assemblies, certain components such as a pulley or support bracket must be installed first, followed by clutch mechanism installation, and then followed by an input belt connection and physical wiring of electrical connections.

The recipient device 28 can be a fan, a machine or other device powered by a mechanical torque input (for example, an air conditioner compressor), a drivetrain, or other suitable object that accepts torque. The clutch mechanism 30 allows selective control over the torque provided to the recipient device 28, and therefore allows control over the operation of the recipient device 28.

The energy harvester(s) 32 can be located adjacent to the clutch mechanism 30 and can harvest of scavenge available energy E in order to generate electricity. The energy harvester(s) 32 can be carried and supported by the clutch mechanism 30. In some embodiments, the energy harvester(s) 32 can be located on a clutch shaft away from the engagement area of the clutch mechanism 30, though in further embodiments one or more of the energy harvesters(s) 32 can be contained within the clutch mechanism 30. The available energy E can be ambient or waste energy in the form of heat, vibration, temperature differentials, light, fluid movement, etc., or combinations of different forms of energy. For instance, the available energy E can include waste energy from the prime mover 22 in the form of vibrations, drivetrain frictional energy, waste heat, or the like. Additionally, or in the alternative, the available energy E can include vibrational or mechanical/kinetic energy from movement of the vehicle 20. Further, the available energy E can be a byproduct of operation of the recipient device 28 (e.g., fan) powered by torque output from the clutch mechanism 30. But the available energy E is not directly dependent upon the explicit provision of an energy supply such as a power grid, an external battery, or combustible fuel and generator. Indeed, the energy harvester(s) 32 can replace the need for external connections to a power source (such as wires to an external electrical supply that powers a rotationally fixed electromagnetic coil of a viscous clutch). Electricity generated by the energy harvester(s) 32 is then used to power the actuating mechanism(s) 38, and can further power additional components of the clutch assembly 26 in some embodiments.

Additionally, transceivers 44 and 46 can be provided to wirelessly transmit signals between the clutch assembly 26 and the vehicle controller 24. In the illustrated embodiment, the transceiver 46 is carried by or with the clutch assembly 26, and the transceiver 44 is carried by or otherwise operably connected to the vehicle controller 24. The transceiver 46 can transmit signals containing data from the sensor(s) 40, and can receive command signals that govern operation of the actuating mechanism(s) 38, for example. The transceiver 46 can be powered by electricity generated by the energy harvester(s) 32.

Figure 2:
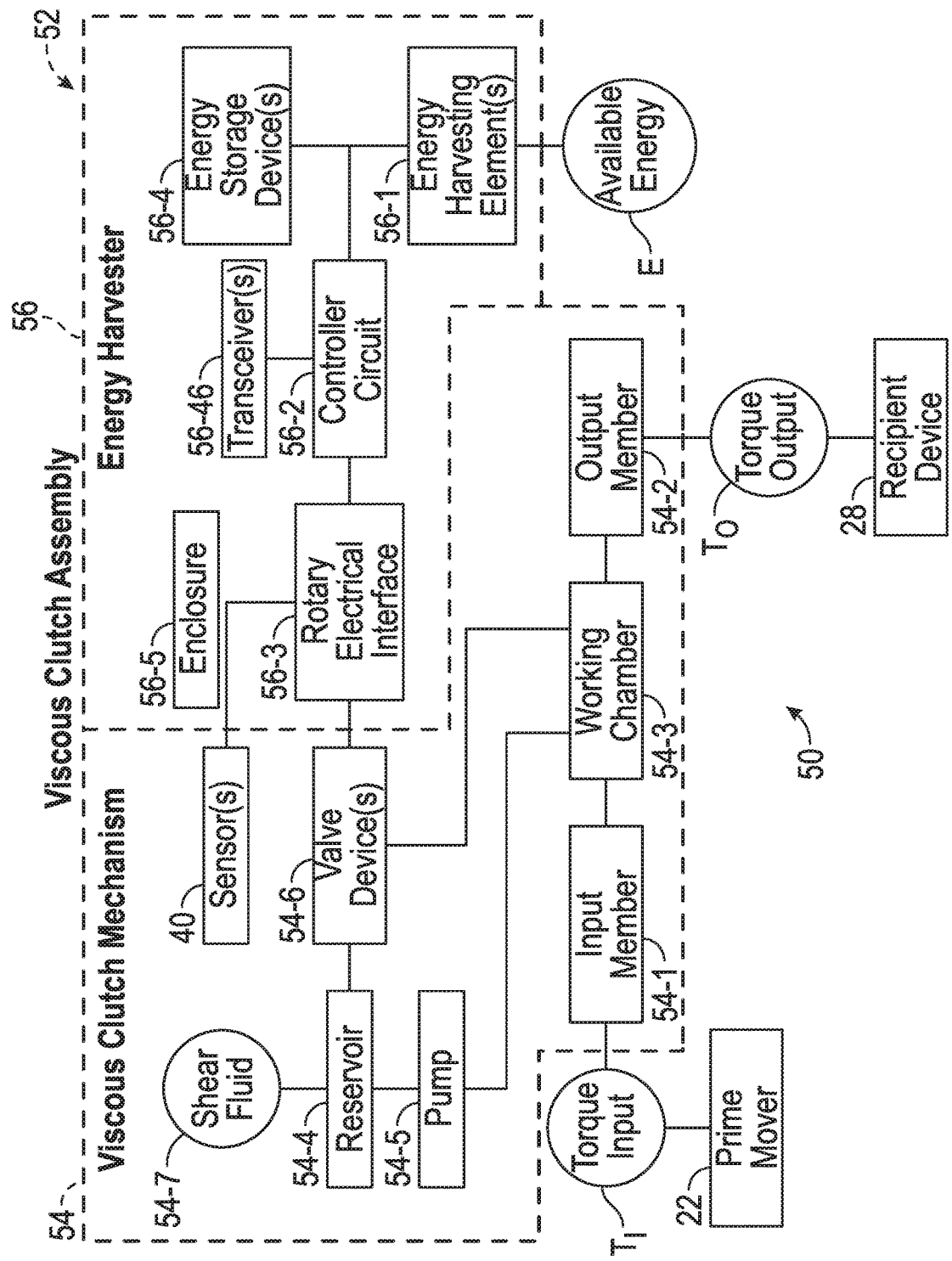
FIG. 2 is a schematic block diagram of an embodiment of a viscous clutch system.

FIG. 2 is a schematic block diagram of an example embodiment of a clutch system 50 that includes a prime mover 22 (for example, an internal combustion engine, electric motor, gas turbine engine, etc.), a recipient device 28 (for example, a fan, machine, etc.), and a viscous clutch assembly 52. In turn, the viscous clutch assembly 52 includes a viscous clutch mechanism 54 and an energy harvester (or energy harvesting device) 56. The energy harvester 56 can also function as a control device for the clutch mechanism 54, and can therefore be considered part of a clutch control assembly. It should be noted that the clutch system 50 of FIG. 2 is shown merely by way of example and not limitation. In further embodiments, certain illustrated components (e.g., the transceiver(s)) can be omitted, and additional components can be included (e.g., a shaft, bearing set, "morning sickness" prevention valve/mechanism, power conditioner or regulator, inverter, etc.) that are not specifically shown.

The viscous clutch mechanism 54 of the illustrated embodiment includes an input member 54-1, an output member 54-2, a working chamber 54-3, a reservoir 54-4, a pump 54-5, and one or more valve devices (or valves) 54-6. The viscous clutch mechanism 54 can optionally further include one or more sensors 40, such as input and/or output speed sensors. The input member 54-1 and the output member 54-2 can be configured as a rotor disk and a housing, though the rotor disk can serve as either the input member or the output member 54-1 or 54-2 in alternate embodiments, with the housing serving as the other of the input member or the output member 54-1 or 54-2. The input member 54-1 accepts a torque input $T_I$ from the prime mover 22. The output member 54-2 selectively and controllably delivers a variable torque output $T_O$ to the recipient device 28. The working chamber 54-3 is positioned between the input and output members 54-1 and 54-2. The reservoir 54-4 is configured to hold a supply of a shear fluid 54-7 (for example, silicone oil), with the reservoir 54-4 typically holding a majority of the shear fluid when the viscous clutch mechanism 54 is in a disengaged condition. The reservoir 54-4 can be rotationally fixed to either the input or output member 54-1 or 54-2 in different embodiments, so as to rotate at all times with either the input or output member 54-1 or 54-2. However, in some applications it is advantageous for the reservoir 54-4 to be carried on, in or by the input member 54-1, such that the reservoir 54-4 rotates whenever the torque input $T_I$ is provided to the clutch mechanism 54 and thus imparts kinetic energy to the shear fluid 54-7 that can help facilitate relatively quick clutch response times (especially for increasing clutch engagement). The valve device(s) 54-6 control flow of the shear fluid 54-7 between the reservoir 54-4 and the working chamber 54-3. The pump 54-5 can pressurize and move the shear fluid 54-7 from the working chamber 54-3 to the reservoir 54-4, such as through a suitable return bore. A pumping action by the pump 54-5 can take place essentially passively and continuously whenever the shear fluid 54-7 is present in the working chamber 54-3 and there is a speed differential between the input and output members 54-1 and 54-2. A fluid delivery path is thus present between the reservoir 54-4 and the working chamber 54-3, and a fluid return path is also present between the working chamber 54-3 and the reservoir 54-4. In some embodiments, the valve device(s) 54-6 control flow of the shear fluid 54-7 along the fluid delivery path only. In alternate embodiments, the valve device(s) 54-6 control flow of the shear fluid 54-7 along both the fluid delivery path and the fluid return path, either concurrently (e.g., with a common mechanism) or independently (e.g., with one or more devices dedicated to each path). In still further embodiments, the valve device(s) 54-6 control flow of the shear fluid 54-7 along the fluid return path only. Controlling shear fluid flow with a valve located along only the fluid delivery path is the most common approach in known viscous clutches. However, the ability to control fluid flow along all paths into and out of the working chamber 54-3 can be beneficial, for instance, by reducing the problem of so-called "morning sickness" by which fluid drains back to the working chamber 54-3 from the reservoir 54-4 when the clutch mechanism 54 is at rest in a particular orientation.

During clutch operation, a degree of engagement of the clutch mechanism 54, and thus a resultant output speed of the output member 54-2 relative to an input speed of the input member 54-1, can be controlled by adjusting a volume of the shear fluid 54-7 present in the working chamber 54-3. Such control can be accomplished as a function of the operation of the valve device(s) 54-6, which can selectively allow or restrict fluid flow along the fluid delivery path, the fluid return path, or both. In some embodiments, the valve device(s) 54-6 can be controlled with a proportional control scheme that relatively precisely controls the valve device(s) 54-6 to a variable set point within a flow restriction range from fully open to fully closed (that is, allowing a particular percentage of flow to be set from 0-100%). In other embodiments, other control schemes are possible, such as a binary on/off control regime or a pulse width modulation (PWM) scheme that varies the time-averaged flow through or past the valve device(s) 54-6 to a desired target flow rate using a schedule that opens and closes the valve device(s) 54-6. The valve device(s) 54-6 are electrically powered in a preferred embodiment. In some embodiments, one or more of the valve device(s) 54-6 can be positionally stable, even when unpowered, such that under a proportional control scheme the valve device(s) 54-6 can remain open to a given, stable degree (or percentage) despite being unpowered. Positional stability can be a function of the configuration of the valve device(s) 54-6, such as due to positional hysteresis and/or the absence of a positional biasing element (e.g., spring) that urges the valve toward a fully open or closed position by default, or can be achieved with a positional latching or locking mechanism. Positional stability of the valve device(s) 54-6 can help reduce overall power demands, by requiring power for valve operation only when the valve device(s) 54-6 must be adjusted to be more open or more closed.

In the illustrated embodiment, the energy harvester 56 includes one or more energy harvesting elements 56-1, a controller circuit 56-2, a rotary electrical interface 56-3, one or more energy storage devices 56-4, an enclosure 56-5, and one or more transceivers 56-46. The energy harvester 56 can include additional components not specifically shown, such as a bearing set, a seal, a power conditioner, a power regulator, an additional rotary electrical interface, etc. For instance, an optional power conditioner can include a voltage regulator, a power factor correction circuit, a noise suppressor, a transient impulse protection device, and/or other suitable electrical power conditioning sub-components. Moreover, certain components illustrated in FIG. 2 can be omitted in further embodiments, such as the transceiver(s) 56-46.

In one embodiment, the energy harvester 56 replaces a prior art electromagnetic control coil, and the energy harvester 56 can be located in the same general location as a prior art electromagnetic control coil (e.g., supported on a shaft that supports the clutch mechanism at a mounting location and external to a clutch housing). The energy harvester 56 can, in some embodiments, scavenge vibrational energy for power. For instance, vibrations produced by the prime mover 22 (e.g., internal combustion engine), by movement of a vehicle in which the system is installed (see FIG. 1), as a byproduct of operation of the recipient device 28 (e.g., fan) powered by the torque output $T_o$ from the clutch mechanism 54, and/or from other sources can be harvested to generate electrical current. In order to help isolate the vibrational energy, the energy harvester 56 can be substantially non-rotating or rotationally stationary. As discussed further below, other types of energy harvesting mechanisms can be used by energy harvester 56 in other embodiments. The utilization of the energy harvester 56 to provide electrical power to the viscous clutch mechanism 54 to power the valve device(s) 54-6, for example, allows for the elimination of a direct wire connection between the viscous clutch assembly 52 and an external power source (e.g., vehicle battery, electrical power grid, or the like).

The energy harvesting element(s) 56-1 are discrete sub-components each capable of generating electrical current from available energy E. The number, location, orientation, and configuration of the energy harvesting element(s) 56-1 can vary as desired for particular applications. For example, the energy harvesting element(s) 56-1 can be configured to harvest vibrational energy to generate electrical current. Moreover, in some embodiments, multiple energy harvesting elements 56-1 can be used together and can have the same or different configurations (e.g., some energy harvesting elements can have different configurations or harvest different forms of available energy). The presence of multiple energy harvesting elements 56-1 can provide fail-safe redundancy, and the use of different elements can allow energy to be harvested across a wider range of operating conditions, such as by having individual elements 56-1 configured to harvest available energy E at particular ranges of frequencies, wavelengths, temperatures, etc., from different energy source characteristics (e.g., vibrations acting in different predominant directions or at different locations), or from multiple forms of available energy E (e.g., vibrational and thermal energy, light and vibrational energy, etc.). For example, vibrational energy harvesting elements 56-1 each utilizing a substantially flat, cantilevered piezoelectric beam can have multiple beam elements arranged and secured in different orientations, and with different lengths and/or weighting masses, to help generate electricity at different vibrational frequencies and/or with different spatial characteristics of the vibrations from which the energy is harvested. Moreover, one or more individual energy harvesting elements can be configured to optimally harvest energy at particular operating conditions, such as having a first energy harvesting element 56-1 optimized for energy harvesting when the clutch mechanism 54 is engaged (e.g., to power a fan at relatively high output speeds) and having a second energy harvesting element 56-1 configured to optimally harvest available energy E when the clutch mechanism 54 is disengaged. In further embodiments, a controllable energy harvesting element 56-1 can be used (e.g., a tunable or actively adjustable energy harvesting device, such as one that can be adjusted based on feedback regarding present operating conditions).

The controller circuit 56-2 can govern the delivery of the electrical current generated by the energy harvesting element(s) 56-1, can command operation of the valve device(s) 54-6 or other components of the clutch mechanism 54, can generate signals or data for transmission by the transceiver(s) 56-46, can process signals or data received by the transceiver(s) 56-46, and/or perform other functions (e.g., switch functions). In some embodiments, the controller circuit 56-2 can incorporate additional functionality such as signal filtering, power conditioning, etc. The controller circuit 56-2 is powered by the electricity generated by the energy harvesting element(s) 56-1. The controller circuit 56-2 can constitute a single integrated circuit board, or can be an assembly of multiple discrete electrical components and/or boards. Because the valve device(s) 54-6, sensors 40, and other components of the clutch mechanism 54 can be relatively small and have relatively low electrical power requirements, and because the electrical power generated by from the energy harvesting element(s) 56-1 can likewise be relatively small, the controller circuit 56-2 can also be relatively small and have relatively low-power characteristics. This allows the controller circuit 56-2 to be more easily encapsulated or otherwise sealed against environmental conditions without causing overheating or requiring a complex heat dissipation mechanism.

The rotary electrical interface 56-3 is an electromechanical device that allows electrical current and/or signals to be transmitted across a rotatable mechanical joint. Electrical power can be carried to components of the viscous clutch mechanism 54 from the energy harvester 56 through the rotary electrical interface 56-3 (e.g., slip ring, brush, braided cable, or the like), in conjunction with suitable wires, leads, traces, or the like. For example, slip rings (also called collector rings) are electromechanical devices that can utilize brushes, liquid metal (e.g., mercury-wetted devices), wireless magnetic coils, or other suitable energy transfer mechanisms to transmit electrical current across a rotatable mechanical joint and are suitable for use as the rotary electrical interface 56-3. Further, loops of tensioned, electrically-conductive braided cables can be put in contact with a shaft, post, ring or a slip or collector ring, or the like to transfer electrical power across a rotary joint. Any number of desired conductive paths can be provided through the rotary electrical interface 56-3. Furthermore, the rotary electrical interface can be sealed, encapsulated, or even made to satisfy explosion-proof requirements, depending upon the anticipated operating environment and the desired application. Although shown in FIG. 2 as being part of the energy harvester 56, the rotary electrical interface is a component that connects different parts and thus interfaces with components of the viscous clutch mechanism 54, for instance.

The energy storage device(s) 56-4 can be one or more batteries and/or other energy storage mechanisms capable of at least temporarily storing electrical energy generated by the energy harvesting element(s) 56-1. Storage of electrical energy in the energy storage device(s) 56-4, and the drawing of electrical energy from the energy storage device(s) 56-4 can be governed by the controller circuit 56-2. The energy storage device(s) 56-4 can be configured to withstand relatively high temperature environments, and addition or in the alternative can be sealed from environmental conditions. During operation, the energy storage device(s) 56-4 allow generated electrical energy to be stored and held in reserve, so that operation of the components of the viscous clutch assembly 52 that are electrically powered can continue to operate despite fluctuations in the amount of generated electricity or in the amount of available energy E over time. In this respect, the energy storage device(s) 56-4 can help ensure a continuously available supply of electricity, even at start-up conditions when the viscous clutch assembly 52 was "off" or at rest for a significant period of time and therefore the energy harvesting element(s) 56-1 did not yet have an opportunity to generate significant (or sufficient) amounts of electricity.

The enclosure (or case) 56-5 can protect elements of the energy harvester 56 from environmental conditions. Moreover, the enclosure 56-5 can help hold the energy harvester 56 in a desired position and/or orientation, such as on support bearings that allow the energy harvester 56 to remain substantially rotationally stationary or fixed. In some embodiments, multiple discrete energy harvesting elements 56-1 can be contained in a single enclosure 56-5, or separate enclosures 56-5 can be provided each containing one or more discrete energy harvesting elements 56-1. In some embodiments, the energy harvesting element(s) 56-1 and the enclosure 56-5 are located outside (i.e., external to) a housing of the viscous clutch mechanism 54. The location of the energy harvester 56 and the enclosure 56-5 can further be driven by the type of energy being harvested. For instance, a light energy harvesting element (e.g., using solar cells) may be located remote from the clutch mechanism 54 to facilitate exposure to available energy E in the form of ambient light. Moreover, a thermal electric generator (TEG) energy harvesting element can be positioned a location of an expected thermal differential, or where a thermal differential can be induced. In some embodiments, a tether or other anti-rotation structure can be used to rotationally fix the energy harvester 56, which can be accomplished through rotationally fixing the enclosure 56-5. However, in some embodiments, the energy harvester 56 can be untethered but weighted so as to resist rotation. For example, the enclosure 56-5 can include one or more masses (not specifically shown) with an asymmetrical distribution to weight the energy harvester 56 so as to resist rotation when supported on a rotatable component of the viscous clutch mechanism 54 (e.g., to resist harvester rotation induced by friction through support bearings).

The transceiver(s) 56-46 can include one or more wireless receivers and/or transmitters, as well as suitable antennae, to allow wireless communication with an external wireless transceiver (see, for example, FIG. 1). The transceiver(s) 56-46 allow control information signals and/or operation data (e.g., speed sensor measurements) to be wireless transmitted between the clutch assembly 52 and an external system (e.g., an engine control unit of a vehicle). The wireless connection made via the transceiver(s) 56-46 replaces the hard-wired connection used in prior art systems for reporting the clutch output speed, which can make installation of the clutch much simpler. The transceiver(s) 56-46 are operably connected to the controller circuit 56-2, and can allow communication between the controller circuit 56-2 and other controllers and/or devices to control operation of the viscous clutch assembly 52 and/or to report data about the operation of the viscous clutch assembly 52. The transceiver(s) 56-46 can be indirectly connected to other components such as the sensor(s) 40, for instance, via the controller circuit 56-2. The wireless communications capabilities of the transceiver(s) 56-46 allow the energy harvester 56 to operate without the need for any wired external connection, yet still allow external communications. The transceiver(s) 56-46 are powered by electricity generated by the energy harvesting element(s) 56-1. Operation of the transceiver(s) 56-46 can be governed by the controller circuit 56-2, and can, for instance, be controlled to help reduce overall power consumption, such as to establish a transmit and/or receive schedule with periods of no signal transmission or reception (e.g., to turn off an antenna or receive mode intermittently) to allow for relatively low-power operation.

The transceiver(s) 56-46 can be used in conjunction with the energy harvester 56 in some embodiments, or can be used without the other components of the energy harvester 56 (e.g., without the energy harvesting elements(s) 56-1) in other embodiments. Use of both the transceiver(s) 56-46 and the energy harvesting element(s) 56-1 can allow the clutch assembly 52 to have no external electrical connections, only mechanical connections for torque input $T_I$, torque output $T_O$, and optional stationary mechanical mounting attachment(s) (e.g., a stationary journal bracket not shown in FIG. 2).

Numerous clutch assembly configurations are contemplated by the present invention. FIGS. 3A to 3D are schematic block diagrams of some alternate embodiments of viscous clutch assemblies 52A to 52D.

Figure 3A:
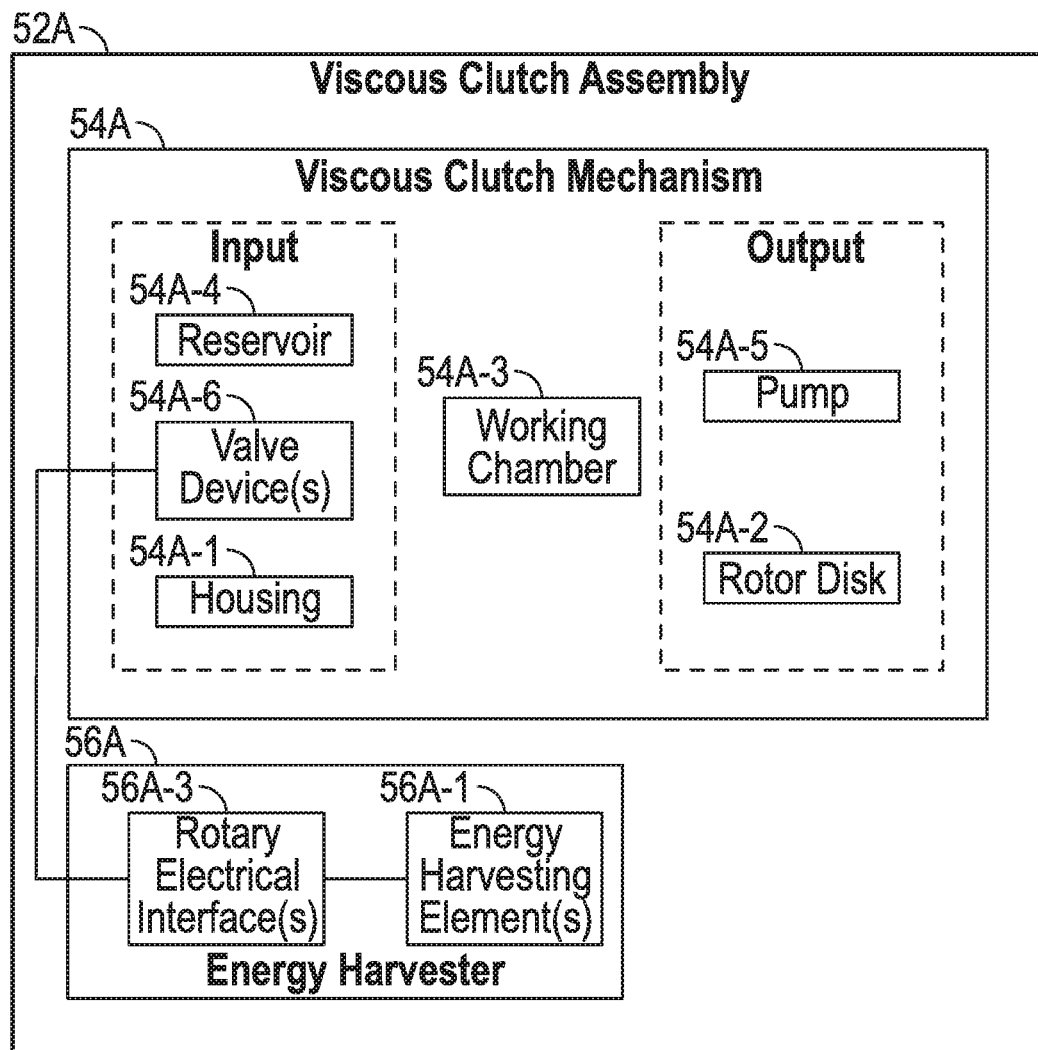
FIGS. 3A to 3D are schematic block diagrams of alternate embodiments of viscous clutch assemblies.

With respect to the embodiment shown in FIG. 3A, a viscous clutch mechanism 54A includes a housing 54A-1, a rotor disk 54A-2, a working chamber 54A-3, a reservoir 54A-4, a pump 54A-5, and one or more valve devices (or valves) 54A-6. The viscous clutch mechanism 54A can optionally further include additional structures not specifically shown, such as one or more speed sensors. The housing 54A-1 serves as the input member and the rotor disk 54A-2 serves as the output member in the illustrated embodiment. Further, the housing 54A-1, the reservoir 54A-4 and the valve device(s) 54A-6 are all part of the input of the clutch mechanism 54A, and co-rotate together, while the rotor disk 54A-2 and the pump 54A-5 are part of the output of the clutch mechanism 54A, and co-rotate together. The housing 54A-1 can be connected to a pulley and belt, a sprocket and chain, a gear and driveshaft, or the like in order to accept torque input. The rotor disk 54A-2 can be connected to a shaft, a pulley and belt, a sprocket and chain, a gear and driveshaft, or the like that accepts torque output from the clutch mechanism 54A. For instance, the rotor disk 54A-1 can include a hub, driven shaft and/or other structure that connects to a recipient device (e.g., a fan) located outside the housing 54A-1. Operation of the viscous clutch mechanism 54A to control the flow of a shear fluid to in turn control a degree of engagement and torque transfer between the input and the output can occur in a manner generally similar to that described above with regard to other embodiments.

As shown in the embodiment of FIG. 3A, an energy harvester 56A includes one or more energy harvesting elements 56A-1 and a rotary electrical interface 56A-3. Although not specifically shown in FIG. 3A, the energy harvester 56A can further include a controller circuit, one or more energy storage devices, an enclosure, one or more transceivers, etc. Operation of the energy harvester 56A can occur in a manner generally similar to that described above with regard to other embodiments.

Figure 3B:
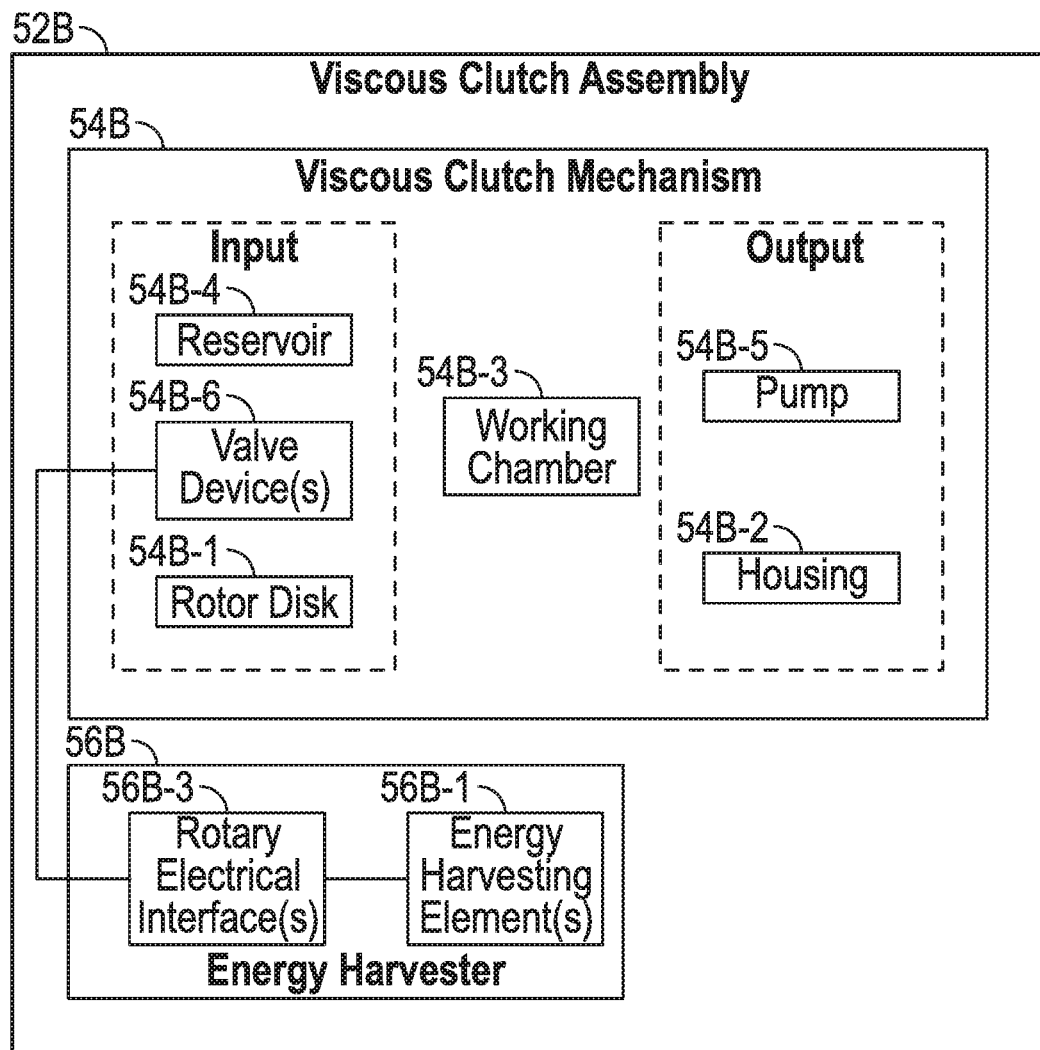

With respect to the embodiment shown in FIG. 3B, a viscous clutch mechanism 54B includes a rotor disk 54B-1, a housing 54B-2, a working chamber 54B-3, a reservoir 54B-4, a pump 54B-5, and one or more valve devices (or valves) 54B-6. The viscous clutch mechanism 54B can optionally further include additional structures not specifically shown, such as one or more speed sensors. The rotor disk 54B-1 serves as the input member and the housing 54B-2 serves as the output member in the illustrated embodiment. Further, the rotor disk 54B-1, the reservoir 54A-4 and the valve device(s) 54A-6 are all part of the input of the clutch mechanism 54A, and co-rotate together, while the housing 54B-2 and the pump 54B-5 are part of the output of the clutch mechanism 54B, and co-rotate together. The rotor disk 54B-1 can be connected to a pulley and belt, a sprocket and chain, a gear and driveshaft, or the like in order to accept torque input. For instance, the rotor disk 54B-1 can include a hub, driven shaft (e.g., a "live" center shaft) and/or other structure that connects to a prime mover. The housing 54B-2 can be connected to a pulley and belt, a sprocket and chain, a gear and driveshaft, or the like that accepts torque output from the clutch mechanism 54B. For instance, the housing 54B-2 can include a pilot that directly connects to a recipient device (e.g., a fan). Operation of the viscous clutch mechanism 54B to control the flow of a shear fluid to in turn control a degree of engagement and torque transfer between the input and the output can occur in a manner generally similar to that described above with regard to other embodiments.

As shown in the embodiment of FIG. 3B, an energy harvester 56B includes one or more energy harvesting elements 56B-1 and a rotary electrical interface 56B-3. Although not specifically shown in FIG. 3B, the energy harvester 56B can further include a controller circuit, one or more energy storage devices, an enclosure, one or more transceivers, etc. Operation of the energy harvester 56B can occur in a manner generally similar to that described above with regard to other embodiments.

Figure 3C:
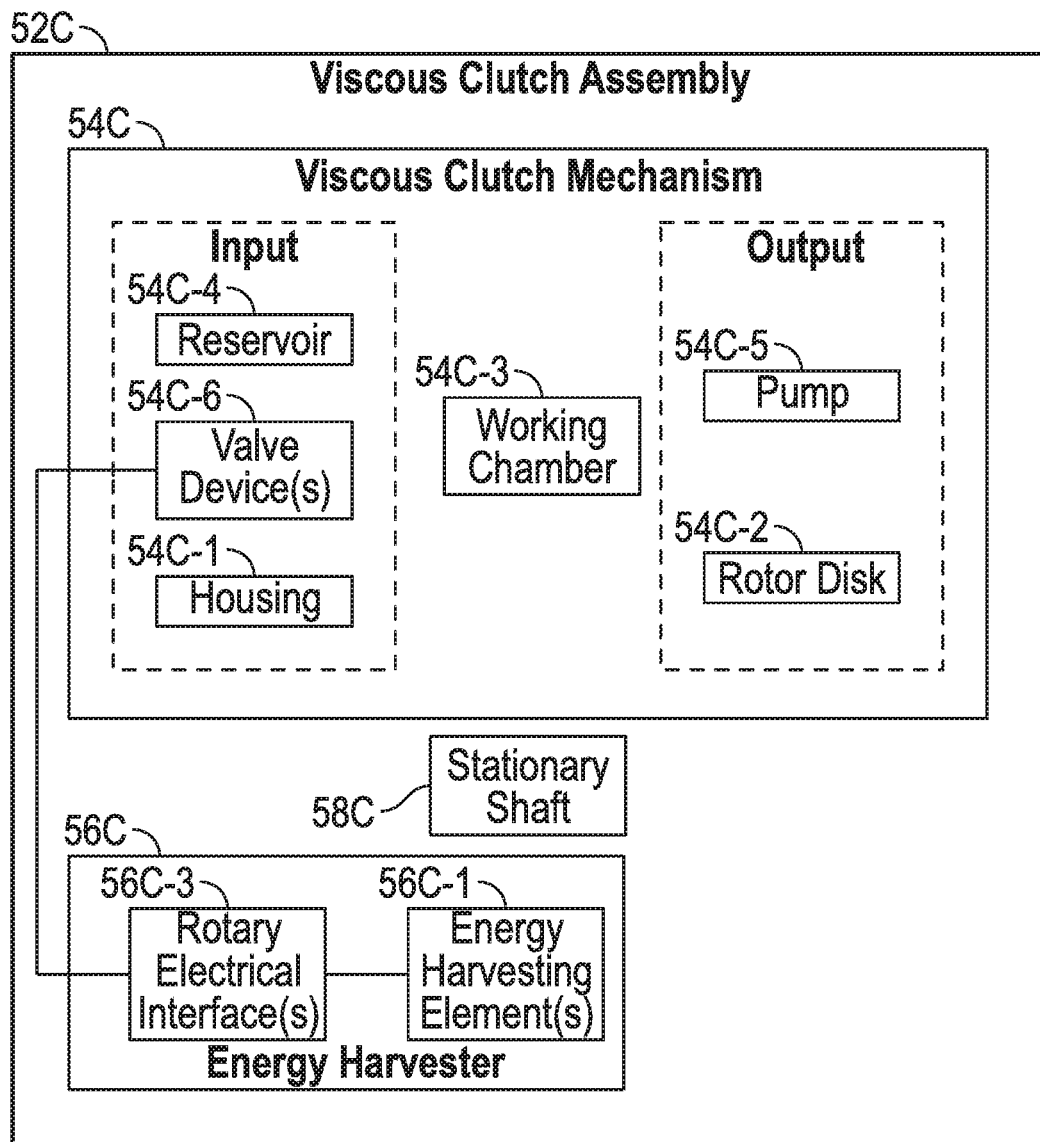

With respect to the embodiment shown in FIG. 3C, a viscous clutch mechanism 54C includes a housing 54C-1, a rotor disk 54C-2, a working chamber 54C-3, a reservoir 54C-4, a pump 54C-5, and one or more valve devices (or valves) 54C-6. The viscous clutch mechanism 54C can optionally further include additional structures not specifically shown, such as one or more speed sensors. The housing 54C-1 serves as the input member and the rotor disk 54C-2 serves as the output member in the illustrated embodiment. Further, the housing 54C-1, the reservoir 54C-4 and the valve device(s) 54C-6 are all part of the input of the clutch mechanism 54C, and co-rotate together, while the rotor disk 54C-2 and the pump 54C-5 are part of the output of the clutch mechanism 54C, and co-rotate together. The housing 54C-1 can be connected to a pulley and belt, a sprocket and chain, a gear and driveshaft, or the like in order to accept torque input. The rotor disk 54C-2 can be connected to a shaft, a pulley and belt, a sprocket and chain, a gear and driveshaft, or the like that accepts torque output from the clutch mechanism 54C. For instance, the rotor disk 54C-1 can include a hub, driven shaft and/or other structure that connects to a recipient device (e.g., a fan) located outside the housing 54C-1. Operation of the viscous clutch mechanism 54C to control the flow of a shear fluid to in turn control a degree of engagement and torque transfer between the input and the output can occur in a manner generally similar to that described above with regard to other embodiments.

A stationary shaft 58C is further provided that can mechanically support the viscous clutch mechanism 54C. For example, the stationary shaft 58C can be part of a journal bracket assembly, and the housing 54C-1 and/or the rotor disk 54C-2 can be supported on the stationary shaft 58C with suitable bearings.

As shown in the embodiment of FIG. 3C, an energy harvester 56C includes one or more energy harvesting elements 56C-1 and a rotary electrical interface 56C-3. Although not specifically shown in FIG. 3A, the energy harvester 56C can further include a controller circuit, one or more energy storage devices, an enclosure, one or more transceivers, etc. Operation of the energy harvester 56C can occur in a manner generally similar to that described above with regard to other embodiments.

A stationary shaft 58C is further provided in the embodiment shown in FIG. 3C that can mechanically support the viscous clutch mechanism 54C relative to a mounting location. For example, the stationary shaft 58C can be part of a journal bracket assembly, and the housing 54C-1 and/or the rotor disk 54C-2 can be supported on the stationary shaft 58C with suitable bearings.

Figure 3D:
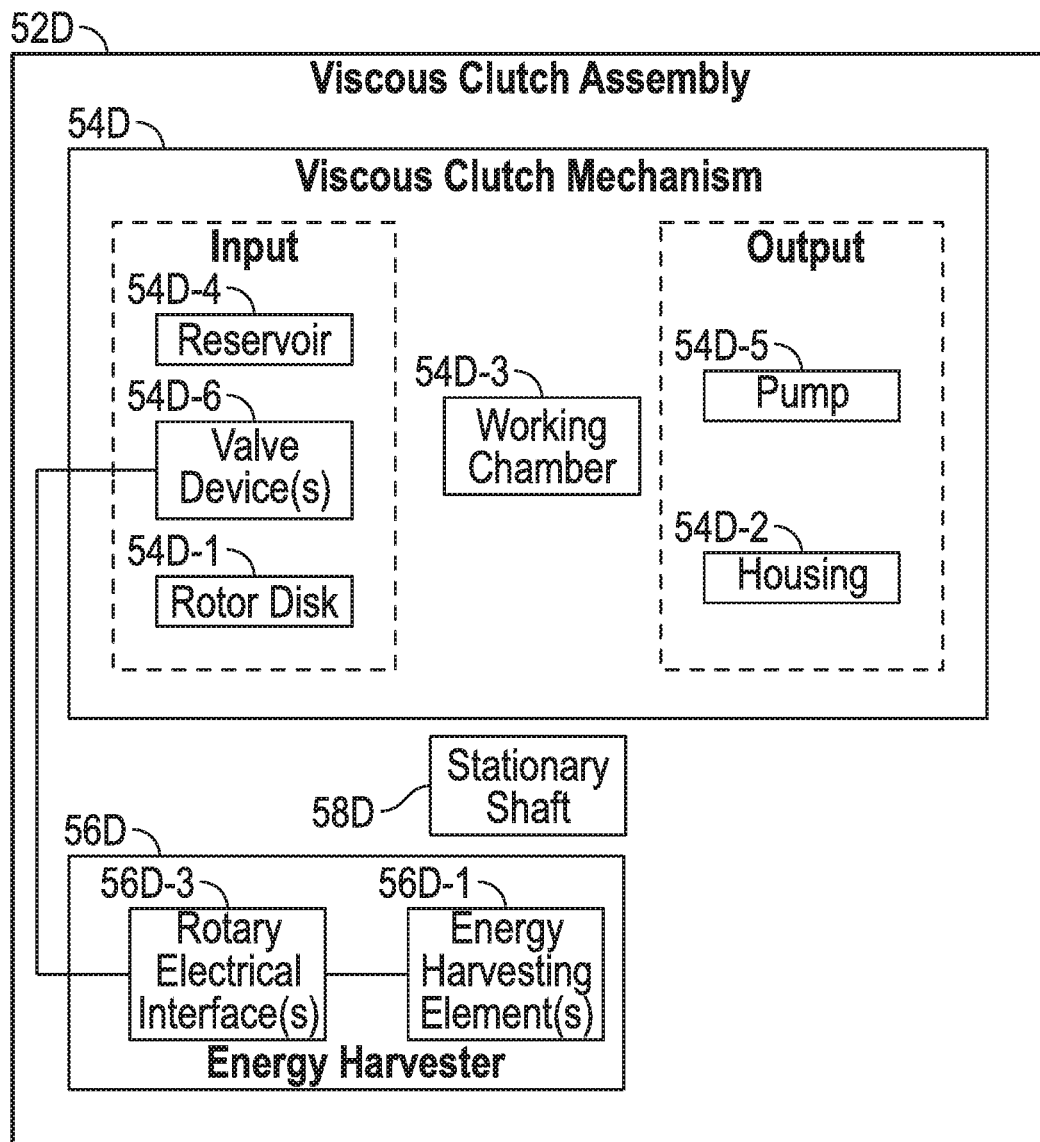

With respect to the embodiment shown in FIG. 3D, a viscous clutch mechanism 54D includes a rotor disk 54D-1, a housing 54D-2, a working chamber 54D-3, a reservoir 54D-4, a pump 54D-5, and one or more valve devices (or valves) 54D-6. The viscous clutch mechanism 54D can optionally further include additional structures not specifically shown, such as one or more speed sensors. The rotor disk 54D-1 serves as the input member and the housing 54D-2 serves as the output member in the illustrated embodiment. Further, the rotor disk 54D-1, the reservoir 54D-4 and the valve device(s) 54D-6 are all part of the input of the clutch mechanism 54D, and co-rotate together, while the housing 54D-2 and the pump 54D-5 are part of the output of the clutch mechanism 54D, and co-rotate together. The rotor disk 54D-1 can be connected to a pulley and belt, a sprocket and chain, a gear and driveshaft, or the like in order to accept torque input. For instance, the rotor disk 54D-1 can include a hub, driven shaft (e.g., a "live" center shaft) and/or other structure that connects to a prime mover. The housing 54D-2 can be connected to a pulley and belt, a sprocket and chain, a gear and driveshaft, or the like that accepts torque output from the clutch mechanism 54D. For instance, the housing 54D-2 can include a pilot that directly connects to a recipient device (e.g., a fan). Operation of the viscous clutch mechanism 54D to control the flow of a shear fluid to in turn control a degree of engagement and torque transfer between the input and the output can occur in a manner generally similar to that described above with regard to other embodiments.

As shown in the embodiment of FIG. 3D, an energy harvester 56D includes one or more energy harvesting elements 56D-1 and a rotary electrical interface 56D-3. Although not specifically shown in FIG. 3D, the energy harvester 56D can further include a controller circuit, one or more energy storage devices, an enclosure, one or more transceivers, etc. Operation of the energy harvester 56D can occur in a manner generally similar to that described above with regard to other embodiments.

A stationary shaft 58D is further provided in the embodiment shown in FIG. 3D that can mechanically support the viscous clutch mechanism 54D relative to a mounting location. For example, the stationary shaft 58D can be part of a journal bracket assembly, and the housing 54D-1 and/or the rotor disk 54D-2 can be supported on the stationary shaft 58C with suitable bearings.

Figure 4:
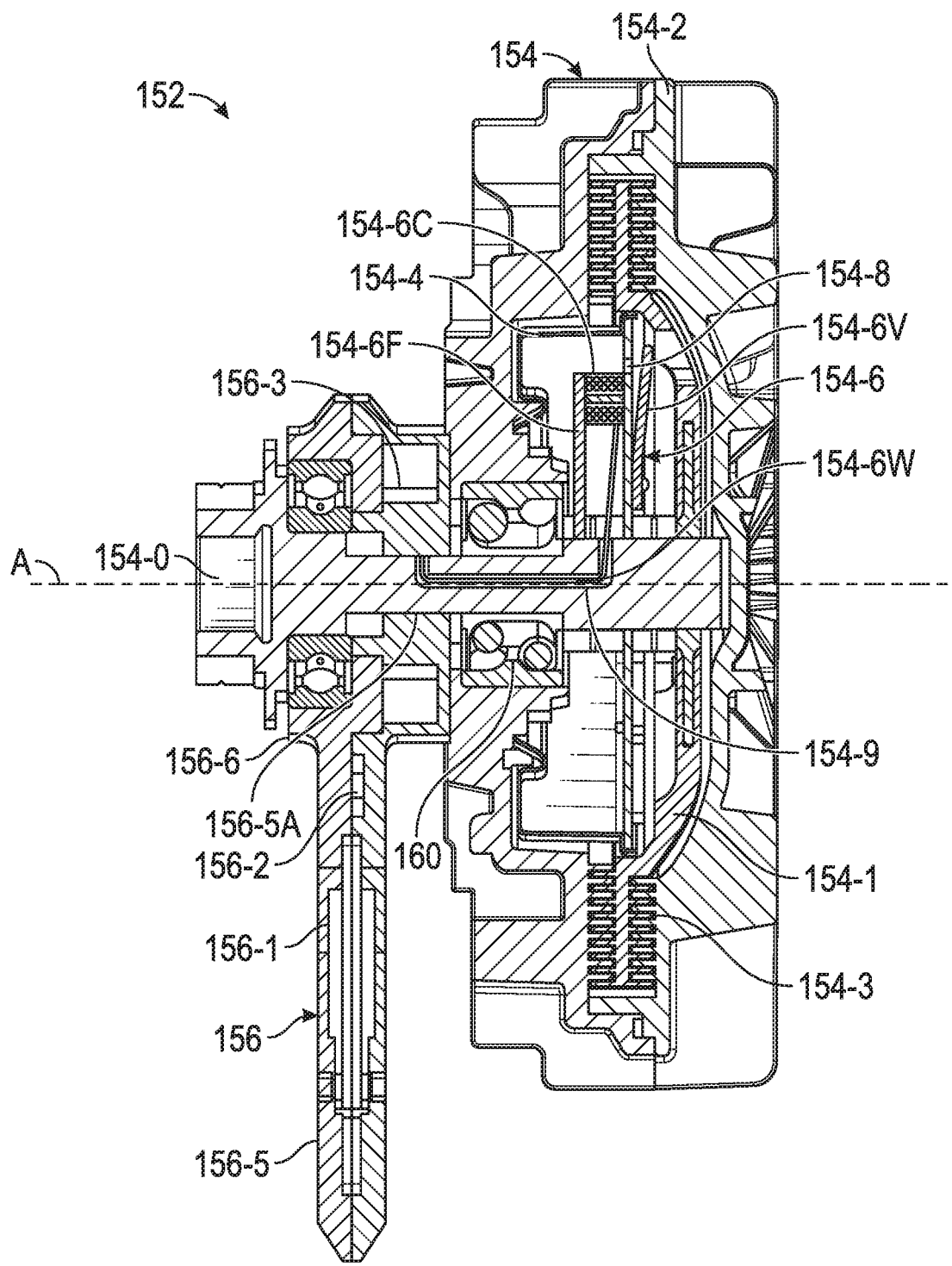
FIG. 4 is a cross-sectional view of an embodiment of a viscous clutch assembly.

FIG. 4 is a cross-sectional view of an embodiment of a viscous clutch assembly 152 that includes a viscous clutch mechanism 154 and an energy harvester 156. The embodiment shown in FIG. 4 is configured as a rotor input and housing output viscous clutch, similar to the embodiment shown in FIG. 3B. The illustrated embodiment of the viscous clutch assembly 152 is shown merely by way of example and not limitation.

The illustrated embodiment of the viscous clutch mechanism 154 includes a drive (input) shaft 154-0, a rotor disk (or rotor) 154-1, a housing 154-2, a working chamber 154-3, a reservoir 154-4, a pump and return bore (not visible in FIG. 4), and a valve assembly 154-6. Additional components of the viscous clutch mechanism 154 are discussed further below.

The illustrated embodiment of the energy harvester 156 includes energy harvesting elements 156-1, a control circuit 156-2, a rotary electrical interface 156-3, an enclosure (or casing container) 156-5 and a bearing set 156-6. However, the cross-sectional view of FIG. 4 does not precisely depict all components of the energy harvester 156. Other suitable components of the energy harvester 156 are discussed below with regard to FIG. 6 (see also, e.g., FIG. 5).

The drive shaft 154-0 can accept a rotational input to the viscous clutch mechanism 152, such as from another shaft, a pulley, etc. (not shown). The drive shaft 154-0 is considered a "live" shaft because it rotates whenever there is a rotational input to the viscous clutch mechanism 154. The drive shaft 154-0 provides structural support for other components of the viscous clutch mechanism 154, and facilitates transmission of torque to certain other components. The drive shaft 154-0 generally defines an axis A of rotation of the viscous clutch mechanism 154. It should be noted that the particular configuration of the shaft 164-0 is shown and described merely by way of example, and not limitation, and can vary as desired for particular applications.

The rotor disk 154-1 can be fixedly attached to the drive shaft 154-0 to co-rotate together. In the illustrated embodiment, as shown in FIG. 4, the rotor disk 154-14 can act as a rotational (torque) input member for the viscous clutch mechanism 154. Moreover, in the illustrated embodiment, the rotor disk 154-1 includes an inner diameter insert and an outer diameter portion. The insert can help provide structural support, though unlike prior art viscous clutches that are controlled via a large magnetic flux circuit there is no need for flux guide inserts to axially transfer magnetic flux from a large, rotationally fixed, external electromagnetic coil though the rotor disk 154-1 (or through the housing 154-2). Annular ribs, grooves or other suitable structures can be provided on one or both sides of the rotor disk 154-1 at or along the working chamber 154-3. Additionally, a notch can optionally be provided in the rotor disk 154-1 to provide additional clearance for the valve 154-6 (e.g., clearance in a generally axial direction). Still further, one or more holes (or windows) can be provided through the rotor disk 154-1 (e.g., at the outer diameter portion) to allow shear fluid to pass between opposite sides of the rotor disk 154-1. The particular configuration of the rotor disk 154-1 is shown and described merely by way of example, and not limitation, and can vary as desired for particular applications.

The housing 154-2 of the illustrated embodiment generally surrounds the rotor disk 154-1 and can act as a rotational (torque) output member, when the viscous clutch mechanism 154 is selectively engaged. A recipient device (not shown in FIG. 4), such as a fan, pulley, output shaft, gear, pump, etc., can be connected to the housing 154-2 to receive torque output from the viscous clutch mechanism 154, as desired for particular applications. The housing 154-2 can be made in two parts, with a body and a cover. In the illustrated embodiment, the housing 154-2 is rotatably supported on the drive shaft 154-0 by bearings 160, thereby allowing the housing 144-2 to rotate relative to the rotor disk 154-1 (at a variable slip speed subject to control). Ribs or grooves that cooperate with similar structures in the rotor disk 154-1 can be provided on an interior of the housing 154-2 along the working chamber 154-3. Cooling fins can optionally be provided on an exterior of the housing 154-2 in a conventional manner to facilitate dissipation of thermal energy into ambient air. Again, it should be noted that the particular configuration of the housing 154-2 is shown and described merely by way of example, and not limitation, and can vary as desired for particular applications.

The working chamber 154-3 is defined between the rotor disk 154-1 and the housing 154-2, and shear fluid can be controllably introduced to the working chamber 154-3 to selectively couple the rotor disk 154-1 and the housing 154-2 to transmit torque therebetween. The working chamber 154-3 and the reservoir 154-4 can be part of a fluid circuit that includes a delivery (or supply) path and a return path. Fluid in the working chamber 154-3 can be returned to the reservoir 154-4 along the return path by passing through a return bore (not visible in FIG. 4). A pump element (not visible in FIG. 4) can be provided at or along the working chamber 154-3 to help pump the shear fluid from the working chamber 154-3 to the reservoir 38 in a conventional manner, such as in an essentially continuous and passive manner.

The reservoir 154-4 can be positioned within the housing 154-2, and can be fixedly attached to the drive shaft 154-0 to rotate with the drive shaft 154-0 whenever a torque input to the viscous clutch mechanism 154 is present. As shown in FIG. 4, the reservoir 154-4 includes a reservoir plate (or lid) and a reservoir cup that collectively form a wall that bounds an interior storage volume. An outlet bore or opening 154-8 leads from the reservoir 154-4 to the working chamber 154-3 along the fluid delivery path, and a fluid return bore (not visible in FIG. 4) leads back to the reservoir 154-4 from the working chamber 154-3 along the fluid return path. The reservoir 154-4 can hold a supply of shear fluid during at least some operating conditions of the viscous clutch mechanism 152, with the reservoir 154-4 typically holding a majority of the shear fluid when the viscous clutch mechanism 152 is in a disengaged condition. Rotation of the reservoir 154-4 when a torque input is provided to the can impart kinetic energy to shear fluid contained in the reservoir 154-4, which can help provide relatively quick engagement of the viscous clutch mechanism 154. The particular configuration of the reservoir 154-4 shown in FIG. 4 and described herein is disclosed merely by way of example, and persons of ordinary skill in the art will appreciate that further embodiments are possible, as desired for particular applications. For example, the reservoir 154-4 can be directly attached to the rotor disk 154-1 in further embodiments, without any space between the reservoir 154-4 and the rotor disk 154-1 and with the rotor disk 154-1 forming a portion of a boundary of the reservoir 154-4. As shown in the illustrated embodiment, the outlet bore or opening 154-8 can be selectively covered and uncovered by the valve device 154-6 to selectively pass the shear fluid to the working chamber 154-3 along the fluid delivery path.

The valve device 154-6 can include a small electromagnetic coil 154-6C and a generally axially pivoting element 154-6V, though in alternative embodiments other types of valve assemblies can be utilized, such as those utilizing rotating valve elements, translating valve elements, linear-actuating proportional valves, etc. As shown in FIG. 4, the small electromagnetic coil 154-6C is positioned within the reservoir 154-4, attached to and carried by the reservoir plate facing away from the rotor disk 154-1, and is located near the outlet bore 154-8. The coil 154-6C includes a winding and a core that is oriented axially (and radially spaced from the axis A). The winding of the coil 154-6C is electrically connected to the rotary electrical interface 156-3 by suitable wires 154-6W, which can be wires rated for high temperature operation (e.g., thermocouple wires surrounded by fiberglass shielding). Suitable wire harnesses, guides, passages, shields, or the like can be provided to help secure and/or protect the wires 154-6W as desired for particular applications. The wires 154-6W can be routed along any suitable path through the clutch mechanism 154, for example, the wires 154-6W are routed through a passageway 154-9 in the shaft 154-0 in the illustrated embodiment. In further embodiments, a portion of the shaft 154-0 or other component of the clutch mechanism 154 can be used to conduct electricity, avoiding the need for a separate wire or trace. The axially pivoting element 154-6V can be attached to and carried by the reservoir 154-4, such as along an exterior of the reservoir plate between the reservoir 154-4 and the rotor disk 154-1. The axially pivoting element 154-6V is spring biased away from the outlet bore 154-8, and is movable to cover the outlet bore 154-8 in response to magnetic flux locally generated by the small electromagnetic coil 154-6C. The small electromagnetic coil 154-6C is positioned close enough to the axially pivoting element 154-6V to directly act upon the axially pivoting element 154-6V with a small magnetic field locally generated from supplied electrical power, without any flux circuit passing axially through flux guides, inserts or the like in the rotor disk 154-1 or the housing 154-2. However, a flux guide 154-6F can extend radially from the small electromagnetic coil 154-6C to the shaft 154-0 (which further extends from the shaft 154-0 through the axially pivoting element 154-6V and back to the small electromagnetic coil 154-6C) to provide a small flux circuit contained entirely inside the clutch mechanism 154 (or optionally entirely within the reservoir 154-4). Such a flux circuit passes through the shaft 154-0 but does not fully cross the axis A (in the radial direction) or encircle the axis A (in the circumferential direction). In other words, the flux circuit of the illustrated embodiment is asymmetrical relative to the axis A. In alternate embodiments, the magnetic field can be localized at a discrete circumferential location that is radially spaced from the axis A and does not encircle or cross the axis A. In alternative embodiments, electrical energy generated by the energy harvester 156 can be used to directly operate the valve device 154-6 within the clutch mechanism 154, and therefore the valve device 154-6 can operate with lower power than prior art clutches utilizing an electromagnetic coil that controls a valve remotely and indirectly via a large magnetic flux circuit. The axially pivoting element 154-6V can be a single element made of a magnetic flux conductive material (e.g., a ferromagnetic material), or can be an assembly made of multiple sub-parts with a magnetic flux-conductive armature engaged with a valve element that need not be magnetic flux conductive (and, in some embodiments, also a separate anchor spring, etc.). In the illustrated embodiment, the entire valve device 154-6 is attached to and carried by the reservoir 154-4, and thus the valve device 154-6 is rotationally fixed to the reservoir 154-4 to co-rotate therewith at all times a torque input is present to the input of the viscous clutch mechanism 154. In this respect, the valve device 154-6 is located at a discrete circumferential location and rotates with the reservoir 154-4 (as well as with the shaft 154-0 and the rotor disk 154-1) whenever there is torque input the clutch mechanism 154, and the movement to actuate the valve device 154-6 is a separate and distinct movement (axial pivoting in the illustrated embodiment). The particular valve device 154-6 shown in FIG. 4 and described in the accompanying text is disclosed merely by way of example. Other types of electrically-powered valves can be used in further embodiments, such as linearly actuated proportional valves, valves using a translating control rod to move an element at a distance, valves that incorporate a reed valve element, and the like. Such other types of valves can also be located inside the viscous clutch mechanism 154 and rotate with the input and/or output of the clutch and be powered by electricity generated by the energy harvester 156 that is delivered to the valve device 154-6 inside the clutch mechanism 154. Moreover, multiple valve devices 154-6 can be utilized in further embodiments, such as equally circumferentially spaced valve devices that facilitate a mass distribution that helps rotationally balance the clutch mechanism 154.

During operation, the valve device 154-6 can be actuated between a first, open position and a second, closed position by controlling the supply of electricity flowing through the clutch mechanism 154 along the wires 154-6W. FIG. 4 illustrates the valve device 154-6 in the first, open position. Spring bias of the axially pivoting element 154-6V can uncover (or open) the outlet bore 154-8 of the reservoir 154-4 by default, thus providing a "fail on" configuration that tends to allow the shear fluid to flow to the working chamber 154-3 to engage the clutch mechanism 154 in the event of a loss of power to the valve device 154-6. In certain embodiments, pulse width modulation (PWM) or other suitable control methodologies can be utilized to govern actuation of the valve device 154-6. In alternate embodiments, the valve device 154-6 can be substantially positionally stable, such that the valve maintains a given amount of shear fluid flow (0%, 100%, and/or any number of other amounts in between 0% and 100%) in the absence of electrical power.

The energy harvester 156 is located at a rear or driven side of the viscous clutch mechanism 154 in the embodiment shown in FIG. 4. More particularly, the enclosure 156-5 is supported on a rear end of the shaft 154-0, aft of the housing 154-2, by the bearings 156-6. The direct mounting of the energy harvester 156 to the shaft 154-0 on the bearings 156-6 allows vibrational energy harvesting elements 156-1 to harvest mechanical waste energy being produced from prime mover or engine vibration that is mechanically transmitted along the shaft 154-0, for example. The shaft 154-0 passes through the energy harvester 156. The energy harvester 156 is thus mechanically supported by the viscous clutch assembly 154 and is physically adjacent to the clutch assembly 154, in close proximity to the housing 154-2. Further, a portion of the rotary electrical interface 156-3 engages the shaft 154-0 and allows electrical connections from the rotary electrical interface 156-3 to the wires 154-6W at the passage 154-9. In this respect, both the bearings 156-6 and the rotary electrical interface 156-3 are located along an opening 156-5A in the enclosure 156-5 for the shaft 154-0 in the illustrated embodiment, with the bearings 156-6 located axially aft of the rotary electrical interface 156-3. The energy harvester 156 is located in generally the same general space otherwise occupied by an external electromagnetic control coil in typical prior art viscous clutches, such as an LCV® 80 fully variable fan drive (available from Horton, Inc., Roseville, Minn., USA). In alternate embodiments, the energy harvester 156 could by carried by a different portion of the clutch mechanism 154, such as being carried by the housing 154-2 or another at least partially externally-exposed component. The energy harvester 156 of the illustrated embodiment has an asymmetrical shape relative to the opening 156-5A, and when installed extends substantially further below the axis A than above the axis A. Indeed, in the illustrated embodiment, a bottom end of the enclosure 156-5 extends radially beyond an outer diameter of the housing 154-2 of the viscous clutch mechanism 154, while an upper end of the enclosure 156-5 is radially shorter than the rotor disk 154-1, the housing 154-2, and the reservoir 154-4 of the clutch mechanism 154. Further, the enclosure 154-5 is relatively thin in the axial direction compared to the housing 154-2 of the clutch mechanism 154. Additional details of the energy harvester 156 are discussed below with respect to FIG. 6.

Figure 5:
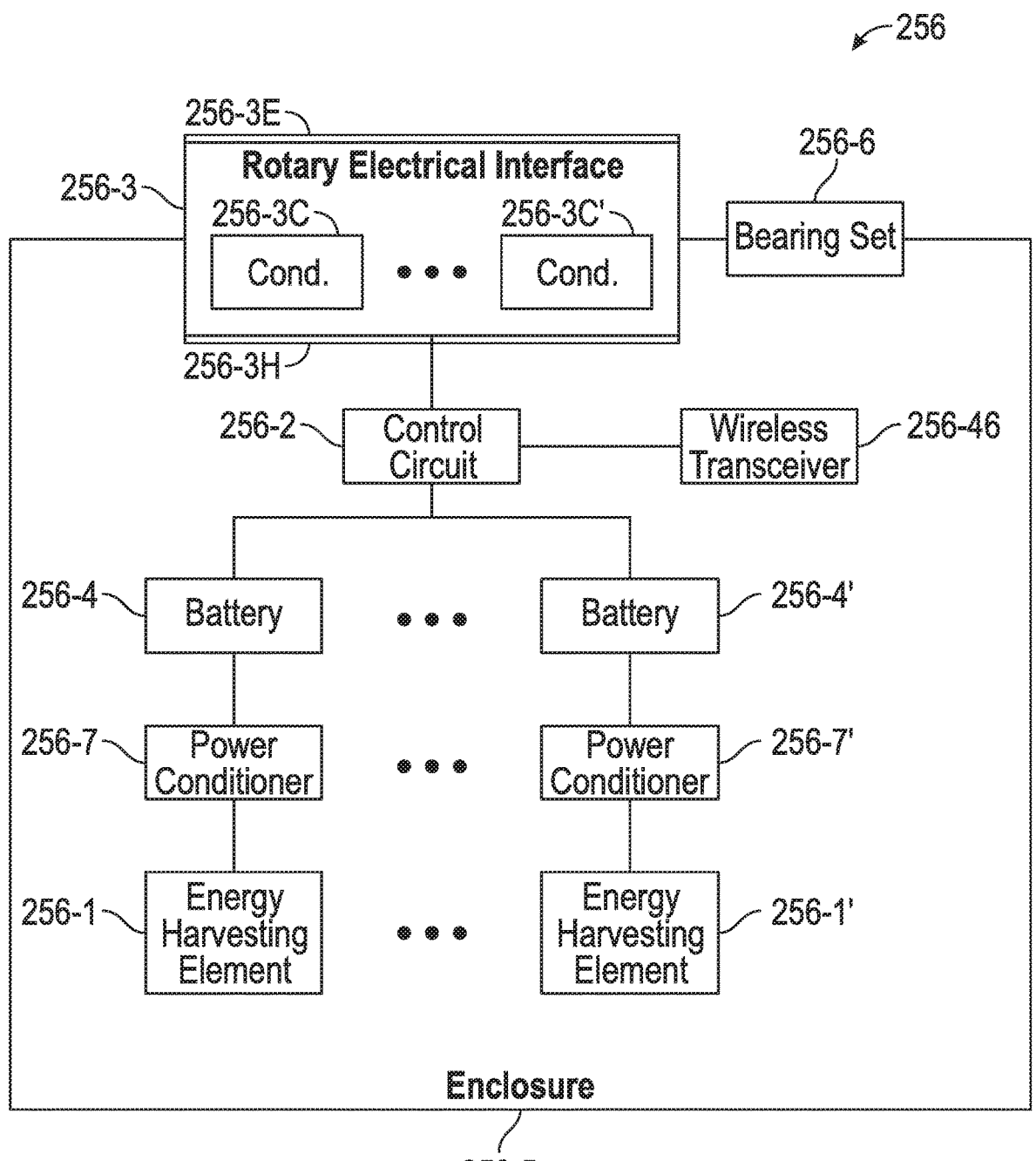
FIG. 5 is a schematic block diagram of an embodiment of an energy harvester with a rotary electrical interface.

FIG. 5 is a schematic block diagram of an embodiment of an energy harvester 256 that includes energy harvesting elements 256-1 to 256-1', a control (or controller) circuit 256-2, a rotary electrical interface 256-3, batteries 256-4 to 256-4', an enclosure 256-5, a bearing set 256-6, power conditioner circuits 256-7 to 256-7', and a transceiver 256-46.

As shown in the illustrated embodiment, each energy harvesting element 256-1 to 256-1' is electrically connected to one of the power conditioner circuits 256-7 to 256-7', which in turn is electrically connected to one of the batteries 256-4 to 256-4', which in turn are all electrically connected to the control circuit 256-2. The wireless transceiver 256-46 is electrically connected to the control circuit 256-2.

Available energy E can be harvested or scavenged by the energy harvesting elements 256-1 to 256-1'. The available energy E can be ambient or waste energy in the form of heat, vibration, temperature differentials, light, fluid movement, etc., or combinations of different forms of energy. The number, location, orientation, and configuration of the energy harvesting elements 256-1 to 256-1' can vary as desired for particular applications. For example, all of the energy harvesting elements 256-1 to 256-1' can be configured to harvest vibrational energy to generate electrical current. Moreover, in some embodiments, the energy harvesting elements 256-1 to 256-1' can have different configurations (e.g., some energy harvesting elements can have different configurations or harvest different forms of available energy). In one example embodiment, at least one of the energy harvesting elements 256-1 to 256-1' includes a cantilevered piezoelectric beam that harvests vibrational energy to generate electrical power. One such suitable piezoelectric vibrational energy harvesting element is the Midé piezoelectric energy harvester model PPA-2014, available from Midé Technology Corporation, Medford, Mass. In some embodiments, vibrational energy harvesting elements 256-1 to 256-1' can be arranged and secured in different orientations (e.g., one or more in a radial or vertical orientation and one or more in a tangential or horizontal orientation), and can have beam elements with different lengths and/or weighting masses (e.g., of different masses and/or attached at different locations along the respective lengths of the beams), to help generate electricity at different vibrational frequencies and/or with different spatial characteristics of the vibrations from which the available energy is harvested. For instance, cantilevered piezoelectric vibrational energy harvesting elements 256-1 to 256-1' can be arranged radially or tangent to the axis A and can be calibrated to achieve higher power output based on the placement of a tip mass on the cantilevered piezoelectric beam at certain frequencies and amplitudes. Moreover, one or more individual energy harvesting elements can be configured to optimally harvest energy at particular operating conditions, such as at particular vibrational frequencies or frequency ranges associated with particular anticipated operating conditions. In further embodiments, one or more of the energy harvesting elements 256-1 to 256-1' can be tunable or actively adjustable, such as one that can be adjusted based on feedback regarding present operating conditions (e.g., based on present characteristics of the available energy E). It should be noted that vibrational energy harvesting is only one possible type of energy harvesting that can be employed by the energy harvester 256. In various alternative embodiments, one or more of the energy harvesting elements 256-1 to 256-1' can be vibrational energy harvesting elements (e.g., piezoelectric beam elements, electroactive polymer elements, acoustical noise harvesting elements), thermoelectric devices, pyroelectric devices, fluidic motion electrical generators (e.g., wind or oil based micro turbine generators, fluidic wave generators), pressure differential energy harvesting elements, photovoltaic elements (e.g., solar cells), and radio frequency (RF), microwave, and other electromagnetic energy harvesting devices.

The control circuit 256-2 governs operation of the energy harvester 256, and optionally also external components as well (e.g., a clutch mechanism, clutch valve device, clutch speed sensor, etc.). The control circuit 256-2 can include one or more microprocessors, suitable memory, firmware or software, or the like. In some embodiments, the control circuit 256-2 can include optional functionality such as signal filtering, power conditioning, etc. For instance, while the power conditioning circuits 256-7 to 256-7' are shown in FIG. 5 as separate components from the control circuit 256-2, such power conditioning circuits 256-7 to 256-7' can be integrated into the control circuit 256-2 in further embodiments.

The rotary electrical interface 256-3 includes multiple conductors 156-3C to 256-3C', which prove a desired number of discrete, electrically isolated pathways for electrical power and/or signals, that can be individually electrically connected to the control circuit 256-2 and/or to ground as well as to external components (e.g., to wires electrically connected to a valve device, sensor, or other electrical device on or within a clutch mechanism). The particular number of conductors 156-3C to 256-3C' can vary, such as depending on the number and types of devices being powered, and any needs for one or more control signal channels separate from power transmission lines. Additionally, the rotary electrical interface 256-3 has a harvester side 256-3H and an external side 256-3E that are rotatable relative to each other, with the conductors 156-3C to 256-3C' allowing electrical current or signals to be transmitted between the harvester side 256-3H and the external side 256-3E. As previously noted, the rotary electrical interface 256-3 is an electromechanical device that allows electrical current and/or signals to be transmitted between the harvester side 256-3H and the external side 256-3E across a rotatable mechanical joint. For example, slip rings (also called collector rings) are electromechanical devices that can utilize brushes, liquid metal (e.g., mercury-wetted devices), wireless magnetic coils, or other suitable energy transfer mechanisms to transmit electrical current across a rotatable mechanical joint between the harvester side 256-3H and the external side 256-3E and are suitable for use as the rotary electrical interface 256-3. Further, loops of tensioned, electrically-conductive braided cables can be put in contact with a shaft, post, ring or a slip or collector ring, or the like to transfer electrical power between the harvester side 256-3H and the external side 256-3E across a rotatable mechanical joint. Furthermore, the rotary electrical interface 256-3 can be sealed, encapsulated, or even made to satisfy explosion-proof requirements, depending upon the anticipated operating environment and the desired application.

The batteries 256-4 to 256-4' can be individually associated with particular energy harvesting elements 256-1 to 256-1', or can alternatively be electrically connected together in a grid or array. The batteries 256-4 to 256-4' can be configured for operation in relatively high temperature environments. Preferably the batteries 256-4 to 256-4' have a relatively large charge and discharge cycle lifespan. Alternatively, or in addition, capacitors (e.g., electrolytic capacitors) can be used to store and/or filter electrical charges. During operation, the batteries 256-4 to 256-4' store electrical power generated by the energy harvesting elements 256-1 to 256-1', providing a buffering effect and allowing electrical power to be available at system startup (stored from prior harvesting activity) even before the energy harvesting elements 256-1 to 256-1' are generating sufficient power, for example.

The energy harvesting elements 256-1 to 256-1', the control circuit 256-2, the batteries 256-4 to 256-4', the power conditioner circuits 256-7 to 256-7', and the transceiver 256-46 can all be located partially or completely within the enclosure 256-5, which can further provide mounting locations for those components. The rotary electrical interface 256-3 can be engaged to the enclosure 256-5, though a portion of the rotary electrical interface 256-3 is at least exposed to an exterior of the enclosure 256-5 to allow electrical connections to the conductors 256-3C to 256-3C' at the external side 256-3E.

The bearing set 256-6 is engaged to the enclosure 256-5 to allow the enclosure 256-5 and other components of the energy harvester 256 to rotate relative to a mounting location. In particular, the bearing set 256-6 can allow the energy harvester 256 to be mounted on a rotatable component (e.g., a rotatable shaft of a clutch mechanism) while remaining substantially rotationally fixed. In some embodiments, the energy harvester 256 can be asymmetrically weighted so as to resist rotation. For example, components can be arranged within the enclosure 256-5 asymmetrically, and/or one or more masses (not specifically shown) can optionally be included in or on the enclosure 256-5. In other words, the energy harvester 256 can be self-weighted, and can have an asymmetrical mass distribution (relative to the axis A) to help resist rotation induced by friction and/or other forces. Such passive asymmetrical weighting can keep the energy harvester 256 substantially rotationally stationary, while still permitting some relatively small movements due to, for instance, friction in the bearing set 256-6. Such small movements may help contribute to energy scavenging, such as where vibrational energy harvesting is used. However, in alternate embodiments, a tether, bracket, or other anti-rotation structure can be used to rotationally fix the energy harvester 256, which can be accomplished by rotationally fixing the enclosure 256-5.

The power conditioners 256-7 to 256-7' can each include a voltage regulator, a power factor correction circuit, a noise suppressor, a transient impulse protection device, and/or other suitable electrical power conditioning sub-components. The particular functionality and circuitry of the power conditioners 256-7 to 256-7' can be selected based on expected power loads, expected power fluctuations, expected noise levels, and the like. For instance, where the energy harvesting elements 256-1 to 256-1' have different configurations (e.g., to scavenge different forms of available energy E), the power conditioners 256-7 to 256-7' may likewise have different configurations to handle different generated power characteristics.

The physical packaging of the energy harvester can take many forms in various embodiments. FIGS. 6 to 8B illustrate some possible embodiments, though further embodiments are also contemplated.

Figure 6:
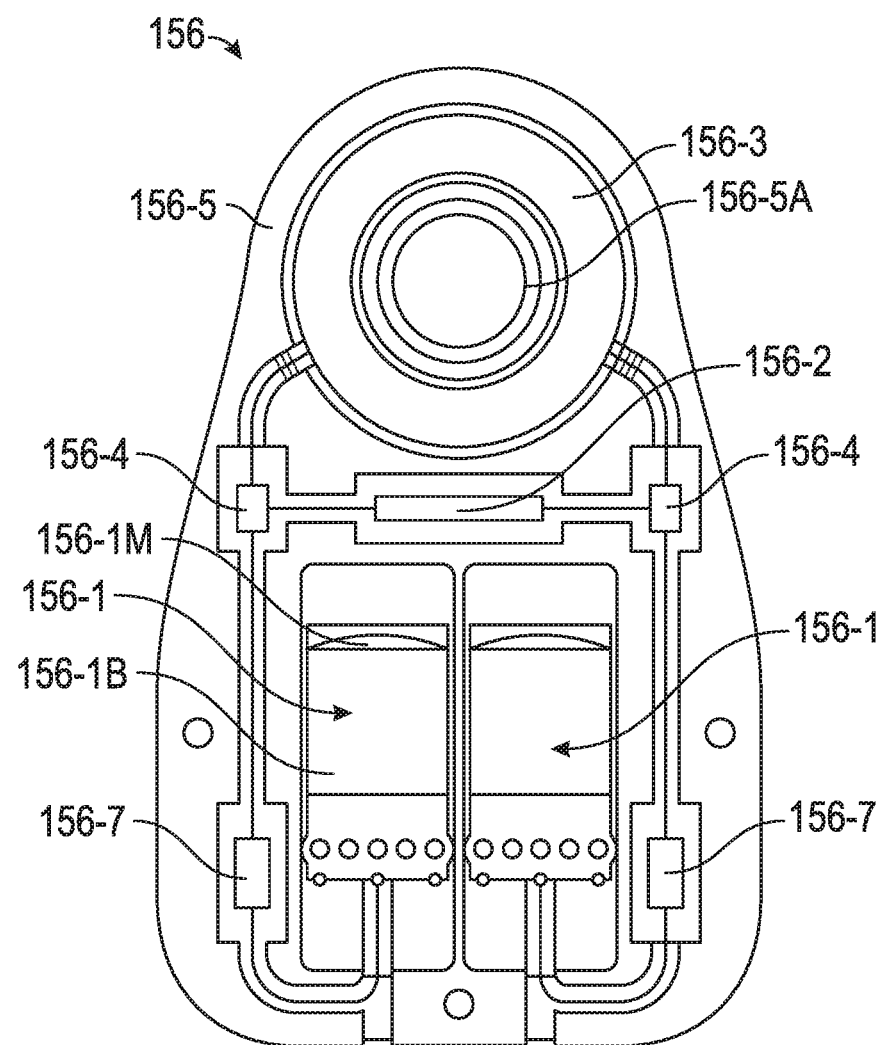
FIG. 6 is a rear elevation view of one half of an embodiment of a vibrational energy harvesting device, shown in isolation, with some components shown in a simplified, schematic manner.

FIG. 6 is a rear elevation view of one half of the vibrational energy harvester 156, with some components shown in a simplified, schematic manner. The illustrated embodiment of the energy harvester 156 includes two energy harvesting elements 156-1, the control circuit 156-2, the rotary electrical interface 156-3, two batteries 156-4, the enclosure (or casing container) 156-5, and two power conditioners 156-7. The bearing set 156-6 is not visible in FIG. 6. The enclosure 156-5 can be injection molded. In some embodiments, the enclosure 156-5 can include cutouts for access to the individual energy harvesting elements 156-1 from outside the enclosure 156-5. However, such cutouts can be closed by covers or omitted entirely in other embodiments. Additionally, the enclosure 156-5 can be made in two parts that are connected together by fasteners or other suitable means, and can optionally have tapered perimeter edges.

In the illustrated embodiment, the energy harvester 156 includes two vibrational energy harvesting elements 156-1 each affixed to the enclosure 156-5 at or near a bottom end of the enclosure 156-5, with cantilevered piezoelectric beams 156-1B of the energy harvesting elements 156-1 extending vertically upward, generally toward the opening 156-5A (as well as toward the axis A and the shaft 154-0; see FIG. 4) and having a tuned mass 156-1M at or near a free end of each of the beams 156-1B. The enclosure 156-5 in the illustrated embodiment is configured to hold the energy harvesting elements 156-1 in a parallel arrangement, that is, with the piezoelectric beams extending parallel to each other (and additionally, co-planar). Some space or internal volume is provided within the enclosure 156-5 to allow free ends of the cantilevered beams of the energy harvesting elements 156-1 to move (e.g., in the axial direction relative to the axis A) relative to the enclosure 156-5. As previously noted, in further embodiments, the energy harvesting elements 156-1 can be arranged in different orientations relative to each other and/or relative to other components of the energy harvester 156.

The rotary electrical interface 156-3 transfers the generated electrical energy and/or other signals across a rotatable joint to the wires 154-6W or other external electrical components. Additional wires within the energy harvester 156 can run, for example, from the energy harvesting elements 156-1 to the power conditioners 156-7, then to the batteries 156-4, and then to the rotary electrical interface 156-3. The batteries 156-4 can also be connected to the control circuit 156-2 to provide power for operation. The physical location and electrical connections between components of the energy harvester 156 can vary as desired for particular applications.

Figure 7A:
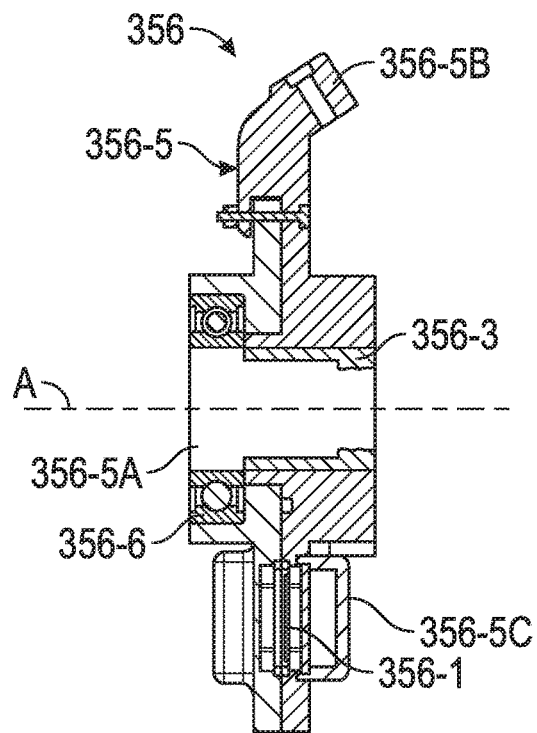
FIG. 7A is a cross-sectional view of another embodiment of a vibrational energy harvester, shown in isolation, with some components shown in a simplified, schematic manner.
Figure 7B:
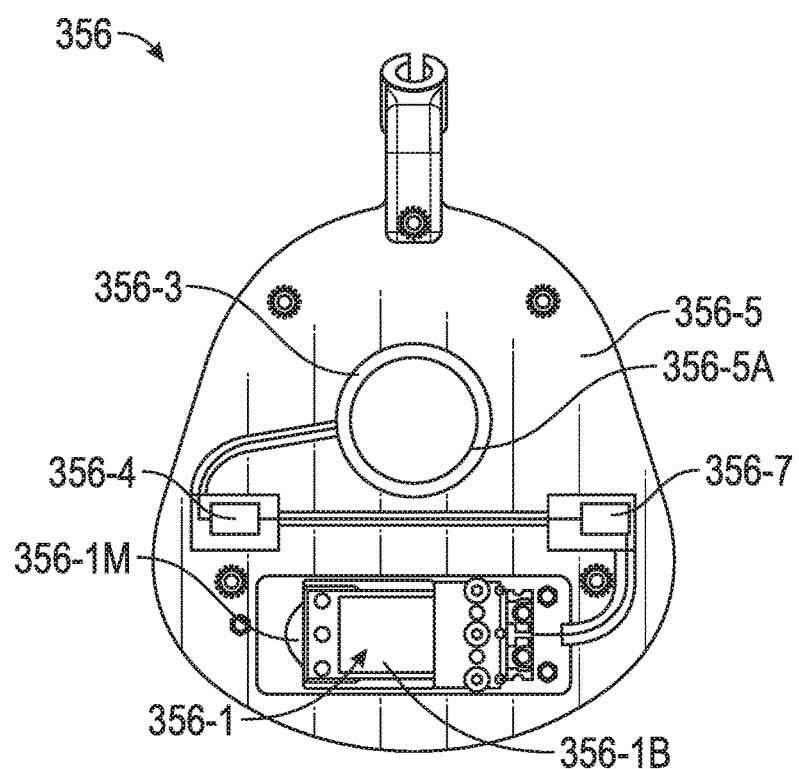
FIG. 7B is a rear elevation view of one half of the vibrational energy harvester of FIG. 7A, with some components shown in a simplified, schematic manner.

FIG. 7A is a cross-sectional view of another embodiment of a vibrational energy harvester 356 and FIG. 7B is a rear elevation view of one half of the energy harvester 356 that reveals interior components. In FIGS. 7A and 7B, some components are shown in a simplified, schematic manner. The illustrated embodiment of the energy harvester 356 includes a single cantilevered piezoelectric vibrational energy harvesting element 356-1 (e.g., a Midé piezoelectric energy harvester model PPA-2014), a rotary electrical interface 356-3, a battery 356-4, an enclosure (or casing container) 356-5, a bearing set 356-6, and a power conditioner 356-7. A control circuit is not visible in FIGS. 7A and 7B but can be provided. In some embodiments, the enclosure 356-5 can include a safety cable attachment bracket 356-5B, to connect to an external cable or tether to rotationally fix the energy harvester 356, and/or a removable cover 356-5C, to allow access to the energy harvesting element 356-1. Additionally, the enclosure 356-5 can have a teardrop-shaped perimeter. The enclosure 356-5 can be injection molded and can be made in two parts that are connected together by fasteners or other suitable means. In the illustrated embodiment, a piezoelectric beam 356-1B of the energy harvesting element 356-1 extends substantially tangential to the axis A and an opening 356-5A in the enclosure 356-5 and has a tuned mass 356-1M at or near a free end of the beam 356-1B. Further, the illustrated vibrational energy harvesting element 356-1 is located at or near a bottom end of the enclosure 356-5, generally opposite the safety cable attachment bracket 356-5B, with the piezoelectric beam of the energy harvesting element 356-1 extending horizontally. Components such as the battery 356-4 and the power conditioner 356-7 can be located radially in between the opening 356-5A and the energy harvesting element 356-1.

The energy harvester 356 can operate in a similar manner to other embodiments described above. The physical location and electrical connections between components of the energy harvester 356 can vary as desired for particular applications.

Figure 8A:
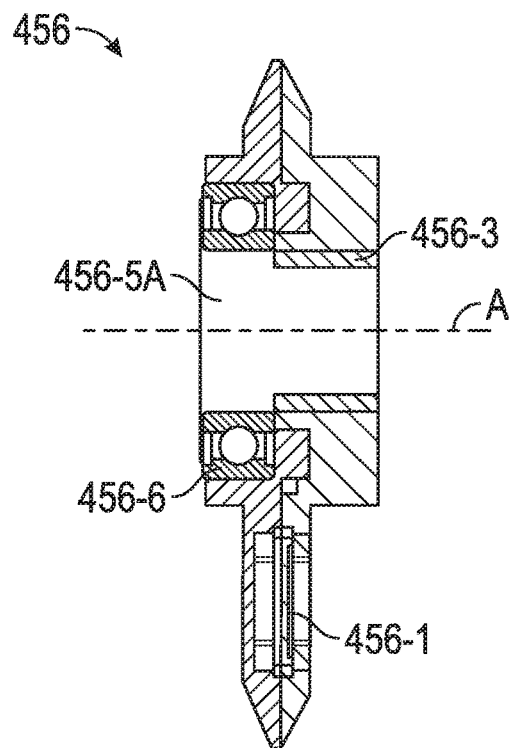
FIG. 8A is a cross-sectional view of yet another embodiment of a vibrational energy harvester, shown in isolation, with some components shown in a simplified, schematic manner.
Figure 8B:
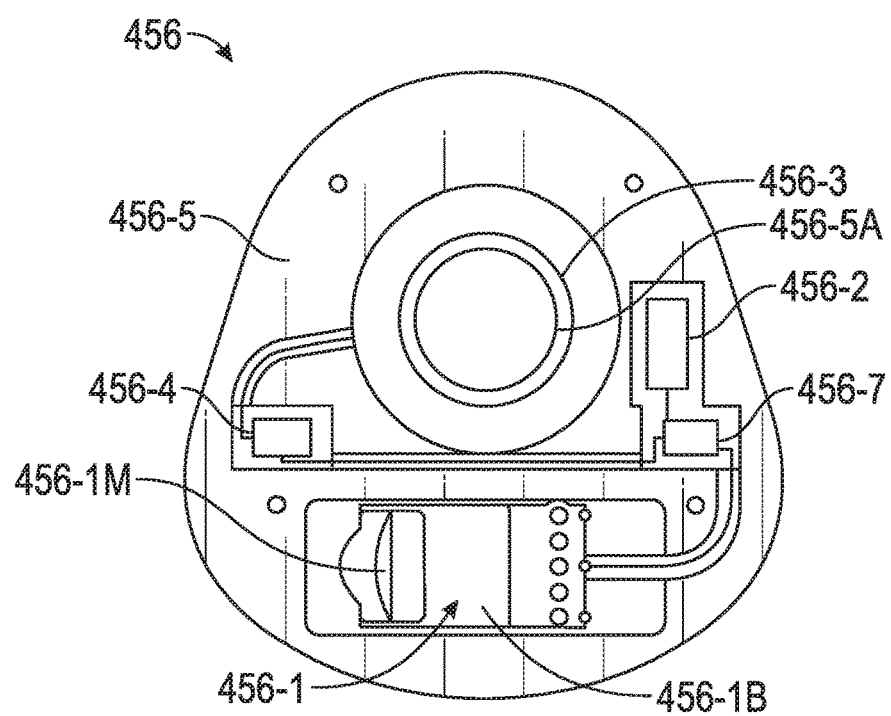
FIG. 8B is a rear elevation view of one half of the vibrational energy harvester of FIG. 8A, with some components shown in a simplified, schematic manner.

FIG. 8A is a cross-sectional view of yet another embodiment of a vibrational energy harvester 456, and FIG. 8B is a rear elevation view of one half of the vibrational energy harvester 456. In FIGS. 8A and 8B, some components are shown in a simplified, schematic manner. The illustrated embodiment of the energy harvester 456 includes a single cantilevered piezoelectric vibrational energy harvesting element 456-1 (e.g., a Midé piezoelectric energy harvester model PPA-2014), a control circuit 456-2, a rotary electrical interface 456-3, a battery 456-4, an enclosure (or casing container) 456-5, a bearing set 456-6, and a power conditioner 456-7. In some embodiments, the enclosure 456-5 can include a cutout for access to the energy harvesting element 456-1 from outside the enclosure 456-5. Additionally, the enclosure 456-5 can have a generally teardrop-shaped perimeter with tapered edges. The enclosure 456-5 can be injection molded and can be made in two parts that are connected together by fasteners or other suitable means. In the illustrated embodiment, a piezoelectric beam 456-1B of the energy harvesting element 456-1 extends substantially tangential to the axis A and an opening 456-5A in the enclosure 456-5 and has a tuned mass 456-1M at or near a free end of the beam 456-1B. Further, the illustrated vibrational energy harvesting element 456-1 is located at or near a bottom end of the enclosure 456-5, with the piezoelectric beam of the energy harvesting element 456-1 extending horizontally. Components such as the control circuit 456-2, the battery 456-4 and the power conditioner 456-7 can be located radially in between the opening 456-5A and the energy harvesting element 456-1.

The energy harvester 456 can operate in a similar manner to other embodiments described above. The physical location and electrical connections between components of the energy harvester 456 can vary as desired for particular applications.

Figure 9:
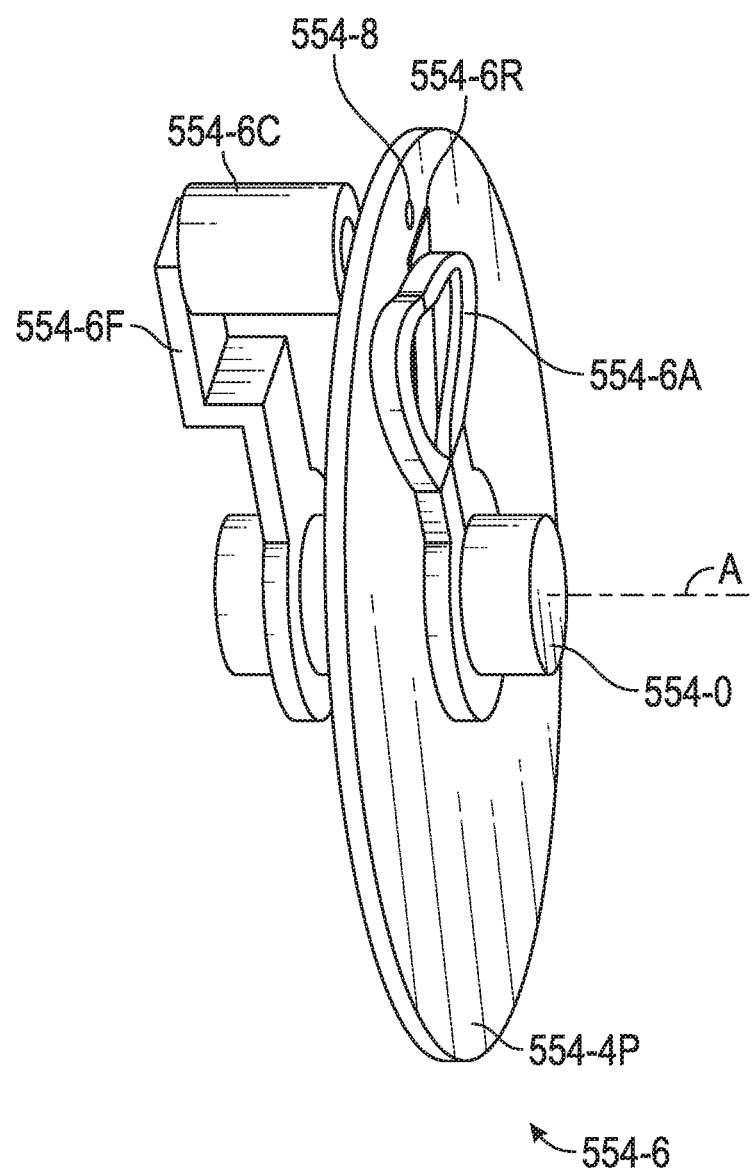
FIG. 9 is a perspective view of part of an embodiment of a viscous clutch assembly.

FIG. 9 is a perspective view of an embodiment of an assembly that includes a shaft 554-0, a reservoir plate (or lid) 554-4P and a valve device 554-6, shown in isolation relative to an axis A. Additionally, an outlet bore 554-8 passes through the reservoir plate 554-4P. Only a portion of the shaft 554-0 is shown in FIG. 9. The illustrated assembly can be used with a viscous clutch mechanism, such as one similar to the viscous clutch mechanism 154 described above. For instance, the illustrated assembly of FIG. 9 can be positioned within a housing of a viscous clutch mechanism, such that the assembly is internal to the clutch mechanism. In the illustrated embodiment, the entire valve device 554-6 is configured to be rotationally fixed relative to both the reservoir plate 554-4P and the shaft 554-0, such that those components all co-rotate together at all times a torque input is present to the input of the viscous clutch mechanism.

The valve device 554-6 can include an armature 554-6A, a small electromagnetic coil 554-6C, a flux guide 554-6F, and a reed valve 554-6R. As shown in FIG. 9, the small electromagnetic coil 554-6C is located adjacent to the reservoir plate 554-4P, and can be attached to and supported by the reservoir plate 554-4P at an interior of an associated reservoir, such that the coil 554-6C is located within an interior volume of the reservoir where a supply of shear fluid can be stored. The coil 554-6C includes a winding and a core that is oriented axially (and radially spaced from the axis A). The winding of the coil 554-6C can be electrically connected to a rotary electrical interface by suitable wires (not shown), which can be wires rated for high temperature operation (e.g., thermocouple wires). Suitable wire harnesses, guides, passages, shields, or the like can be provided to help secure and/or protect the wires as desired for particular applications. The armature 554-6A can be carried by the reservoir, such as along an exterior of the reservoir plate 554-4P (opposite the electromagnetic coil 554-6C and the magnetic flux guide 554-6F). The armature 554-6A can be spring biased to a default position and can pivot (or, alternatively, translate) in a generally axial direction, against the spring biasing force, in response to an applied magnetic field generated by the electromagnetic coil 554-6C. The reed valve 554-6R can also be carried with the reservoir, such as along an exterior of the reservoir plate 554-4P (opposite the electromagnetic coil 554-6C and the magnetic flux guide 554-6F). The reed valve 554-6R can be spring biased to a default position (e.g., an open position) and can pivot (or alternatively translate) in a generally axial direction, against the spring biasing force, in response to an applied axial force from the armature 554-6A. Movement of the reed valve 554-6R can selectively cover and uncover the outlet bore 554-8 in the reservoir plate 554-4P in order to selective control the flow of shear fluid out of (or alternatively, into) the reservoir. In the illustrated embodiment the outlet bore 554-8 is oriented axially, that is, fluid flow the outlet bore 554-8 occurs in generally the axial direction, parallel to the axis A. The reed valve 554-6R can be spring biased to an open position (uncovering the outlet bore 554-8 by default, to provide "fail on" operation in the event of a loss of electrical power to the valve device 554-6. In some embodiments, the armature 554-6A and the reed valve 554-6R of the valve device 554-6 can operate in a manner generally similar to the valve assembly disclosed in PCT International Patent Application Publication No. WO2012024497, though without the large magnetic flux circuit and external coil disclosed in that prior patent application.

In the embodiment shown in FIG. 9, a small flux circuit is formed that passes from the electromagnetic coil 554-6C through the reservoir plate 554-4P to the armature 554-6A across an axial air gap (which can become smaller or close when the valve is actuated), then through the shaft 554-0 to the flux guide 554-6F and back to the electromagnetic coil 554-6C. The small electromagnetic coil 554-6C is positioned close enough to the armature 554-6A for a generated magnetic field to directly act on armature 554-6A. The flux circuit can pass axially across the reservoir plate 554-4P as the flux circuit passes between the coil 554-6C and the armature 554-6A, and can also pass through the reed valve 554-6R in some embodiments. The reservoir plate 554-4P need not be made of a magnetic flux conducting material so long as the reservoir plate 554-4P does not block the locally-generated generated magnetic field from reaching and acting upon the armature 554-6A. The small flux circuit can be contained entirely inside an associated clutch mechanism 154, and can form a loop that extends generally radially at a discrete circumferential location. Moreover, the flux circuit passes through the shaft 554-0 but need not fully cross the axis A (in the radial direction) or encircle the axis A (in the circumferential direction). In other words, the flux circuit of the illustrated embodiment is circumferentially asymmetrical relative to the axis A and is positioned at a discrete circumferential location. In alternate embodiments, the magnetic flux circuit can be localized at a discrete circumferential location that is also radially spaced from the axis A and does not encircle or cross the axis A or reach the shaft 554-0. Because the electromagnetic coil 554-6C is carried with a rotatable portion of the clutch mechanism, an electricity is supplied to the coil 554-6C within a rotatable portion of the clutch mechanism, the flux circuit can have only a single air gap, though in some embodiments a second air gap (e.g., radial air gap) may be present between the shaft 554-0 and the armature 554-6A. Magnetic flux conducting components such as the armature 554-6A, the flux guide 554-6F and/or the core of the electromagnetic coil 554-6C can be made of annealed steel (e.g., low carbon annealed steel for the armature 554-6A and the flux guide 554-6F) and/or ferrite (e.g., a NiZn ferrite electromagnetic coil core) in order to provide relatively high magnetic permeability even at temperatures of 250° C. or more. The reservoir plate 554-4P (and other wall(s) of the reservoir 554-4) can be made of aluminum. It has been found that the selection of materials with relatively high magnetic permeability (a dimensionless proportionality factor with a value of 1 indicating no magnetization in response to an applied magnetic field), such as a magnetic permeability of 750 or more, can reduce the power required to close the valve 554-6 by 60-80% (depending on operating conditions). Further, use of aluminum for the reservoir plate 554-4P helps to concentrate magnetic flux in a concise path along the flux circuit, rather than spread the magnetic flux in a way that reduces the magnetic field strength and decreases efficiency.

Moreover, multiple valve devices 554-6 can be utilized in combination in further embodiments, such as equally circumferentially spaced valve devices that facilitate a mass distribution that helps rotationally balance the associated clutch mechanism. Moreover, in further embodiments different valve devices 554-6 used together can have different configurations in order to perform different functions, such as having one valve device controlling shear fluid flow out of the reservoir, and another valve device independently controlling shear fluid flow into the reservoir.

Figure 10A:
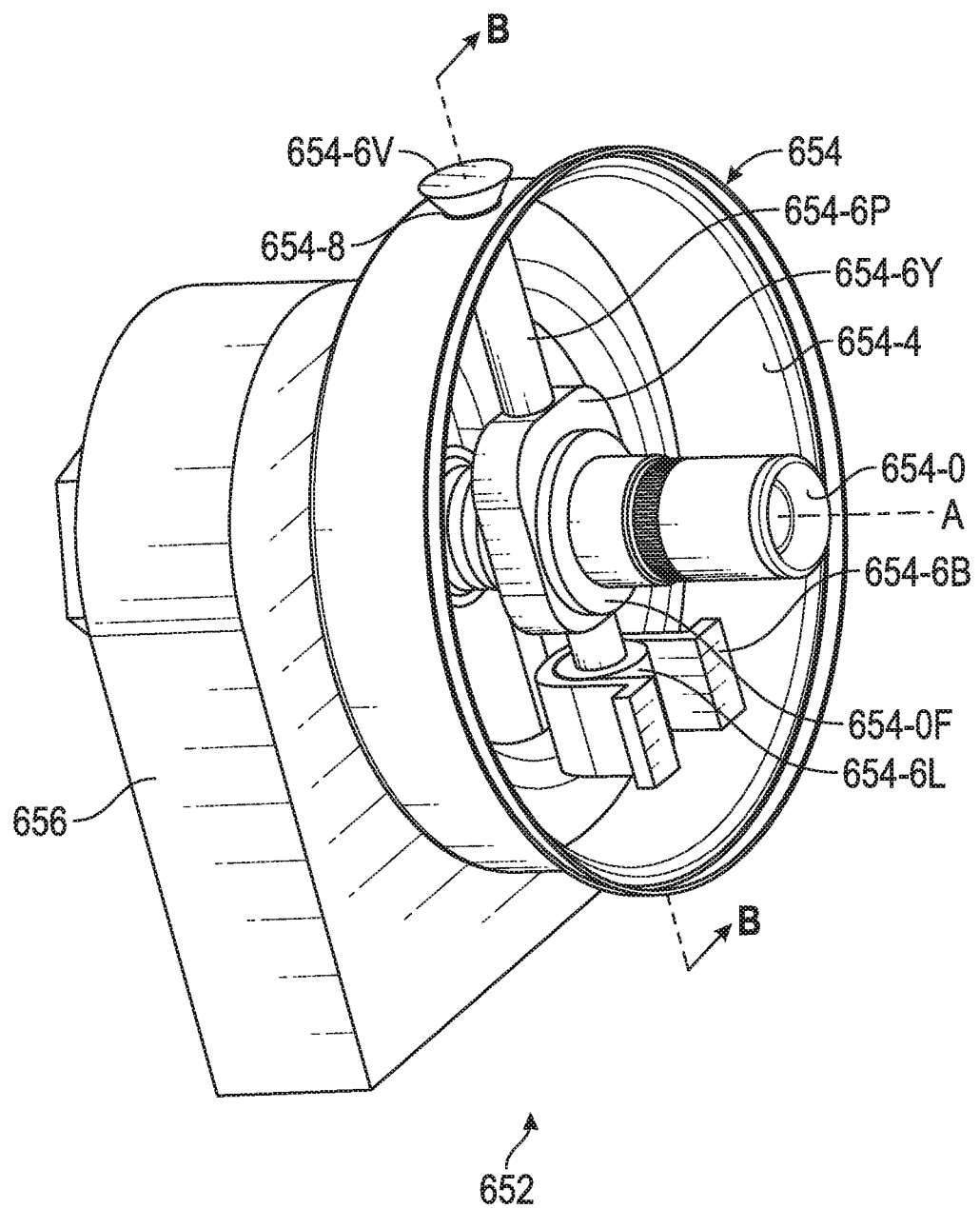
FIG. 10A is a perspective view of a portion of another embodiment of a viscous clutch assembly.
Figure 10B:
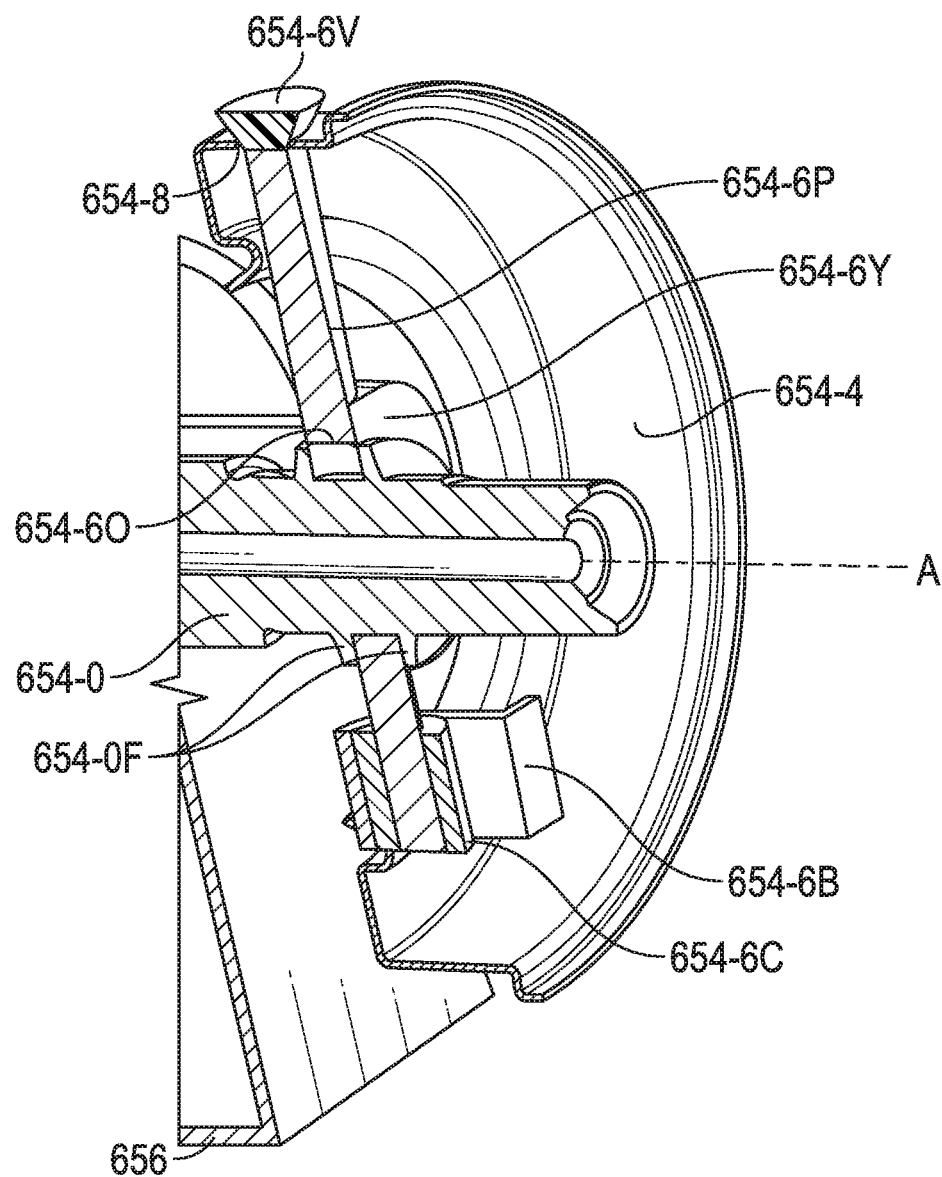
FIG. 10B is a cross-sectional view of the viscous clutch assembly, taken along line B-B of FIG. 10A.
Figure 10C:
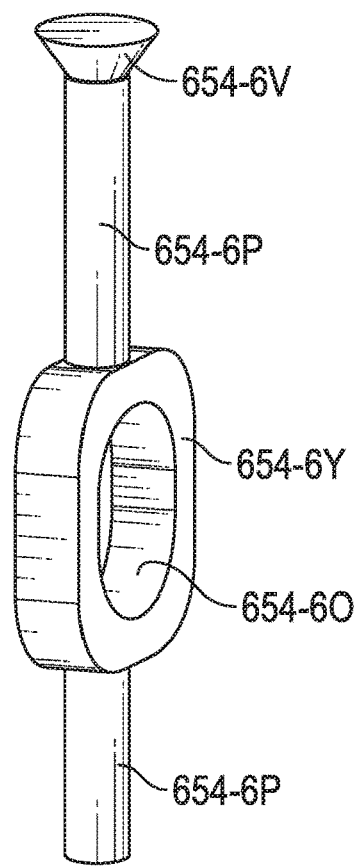
FIG. 10C is a perspective view of a needle assembly of the viscous clutch assembly of FIGS. 10A and 10B, shown in isolation.

FIG. 10A is a perspective view of a portion of an embodiment of a viscous clutch assembly 652 that includes a viscous clutch mechanism 654 (of which only a portion is shown in FIG. 10A, to better reveal certain internal components) and an energy harvester 656. FIG. 10B is a cross-sectional view of the viscous clutch assembly 652 taken along line B-B of FIG. 10A. FIG. 10C is a perspective view of a needle assembly of a valve device 654-6, shown in isolation.

In the illustrated embodiment, the viscous clutch mechanism 654 includes a shaft 654-0 and a reservoir 654-4 that are rotationally fixed relative to each other, and co-rotate together whenever there is a torque input to the viscous clutch mechanism 654. In one embodiment, the shaft 654-0 and the reservoir 654-4 are connected to a clutch input, and rotate at the input speed whenever a torque input is present. Not shown in FIG. 10A are input and output members, such as a housing and a rotor disk, a working chamber, and a pump mechanism. Either a rotor disk or a housing can be connected in a rotationally fixed manner to the shaft 654-0 in various embodiments. Other typical viscous clutch components, such as those discussed above with respect to embodiments shown in FIGS. 2-4, can be included. For instance, a reservoir plate is not shown in FIG. 10A, in order to reveal components located behind it, but can be included at a front side of the reservoir 654-4 (to the right as depicted in FIG. 10A).

The viscous clutch mechanism 654 further includes an electrically-actuated needle valve device 654-6. The valve device 654-6 is configured to rotate relative to axis A whenever there is a torque input to the clutch mechanism 654, such as to co-rotate with the input of the clutch mechanism and the reservoir 654-4. The valve device 654-6 can be substantially rotationally balanced, which can be facilitated by substantial lateral symmetry, though as discussed below portions of the valve device 654-6 can move (e.g., translate) which can result in some radial mass asymmetries under at least some operational conditions.

Figure 11A:
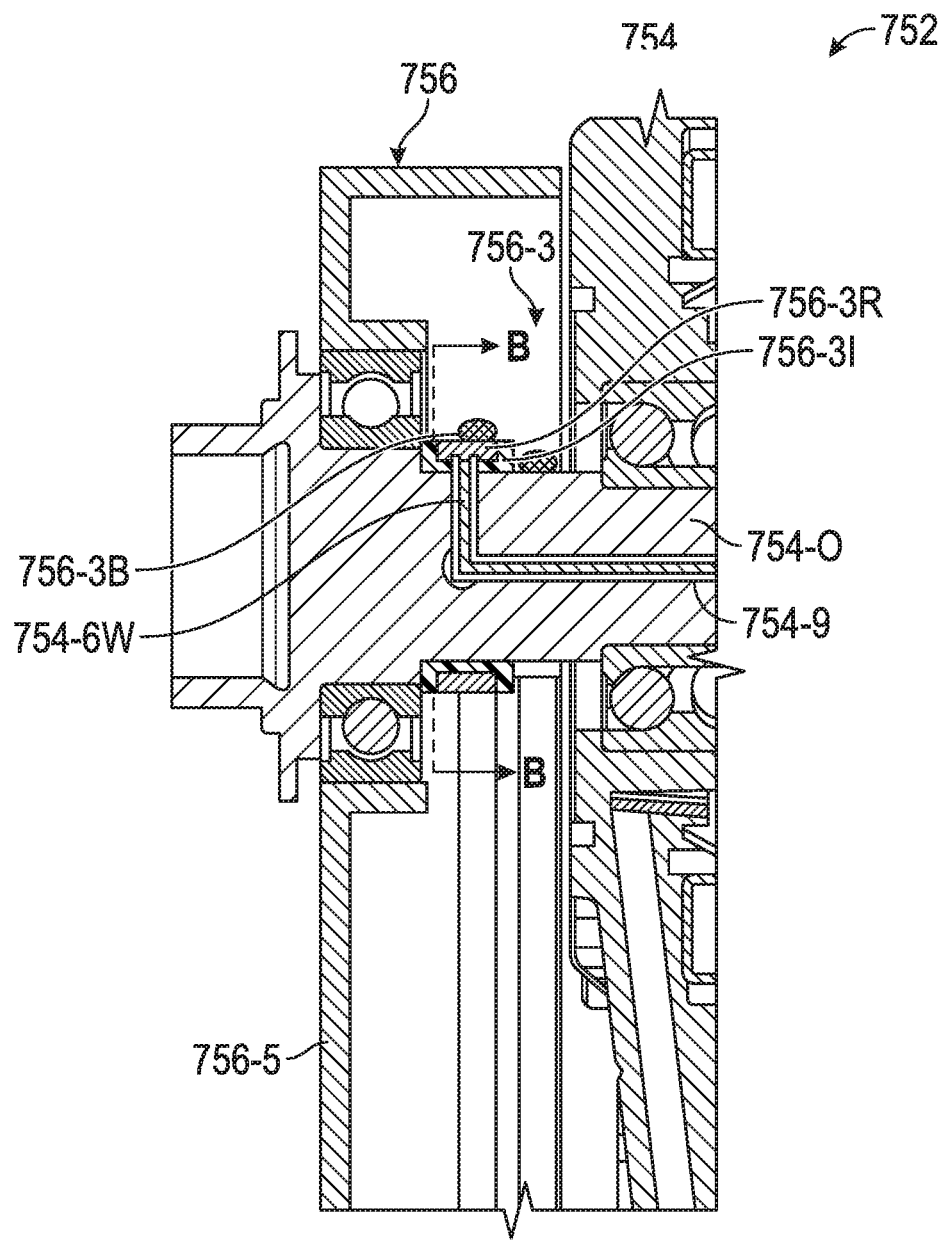
FIG. 11A is a sectional view of an embodiment of an assembly with a tensioned cable loop rotary electrical interface.

In the illustrated embodiment, the needle valve device 654-6 includes a mounting bracket 654-6B, a linear actuator 654-6L, a plunger shaft 654-6P, a valve plug 654-6V, and a yoke (or crosshead or guide ring) 654-6Y. The mounting bracket 654-6B can be attached to the reservoir 654-4, such as to a reservoir plate (not shown), to secure the linear actuator 654-6L. In the illustrated embodiment, the mounting bracket 654-6B can a generally U-shaped configuration, though other types of brackets or other securing means can be used as desired for particular applications. The linear actuator 654-6L is electrically powered, such as by electrical current from the energy harvester 656, and converts electrical power to controlled linear motion. In one embodiment, the linear actuator 654-6L is a solenoid linear actuator, in which electrical power is used to generate a small magnetic field with a small coil, with the generated magnetic field being contained inside the actuator 654-6L at a discrete circumferential location that can be radially spaced from the axis A. Further, the plunger shaft 654-6P (or a connected component) can be part of the conductive material pulled into the solenoid's magnetic field when the linear actuator 654-6L is energized. It should be noted that the linear actuator 654-6L is shown only schematically in cross-section in FIG. 10B, without a detailed depiction of internal components. The plunger shaft 654-6P, the valve plug 654-6V, and the yoke 654-6Y collectively form a movable needle assembly. The plunger shaft 654-6P is operatively engaged to the linear actuator 654-6L, such that operation of the linear actuator 654-6L can selectively translate the plunger shaft 654-6P in a radial direction (relative to the axis A). In the illustrated embodiment the plunger shaft 654-6P is generally cylindrical in shape, though other configurations are possible as desired for particular applications. The yoke 654-6Y is connected to the plunger shaft 654-6P and/or the linear actuator 654-6L, and includes an opening 654-6O (see FIG. 10C) that allows the shaft 654-0 to pass through while still permitting linear translation relative to the shaft 654-0 (and the axis A) to be produced by actuation of the linear actuator 654-6L. As shown in the illustrated embodiment, the opening 654-6O has a non-circular, oblong or otherwise irregular shape (e.g., with an obround-shaped perimeter). The yoke 654-6Y interrupts two sections of the plunger shaft 654-6P in the illustrated embodiment, but other configurations are possible in further embodiments. Additionally, one or more flanges 654-0F can be provided on the shaft 654-0 to help retain and guide movement of the yoke 654-6Y. As shown in FIG. 11A, two flanges 654-0F are provided at opposite sides of the yoke 654-6Y. The yoke 654-6Y can be made of multiple pieces to allow for assembly around the shaft 654-0, in between the flanges 654-0F. During operation, the yoke 654-6Y can permit mechanical force to be transmitted radially across the axially-extending shaft 654-0 and the axis A. The valve plug 654-6V is connected to the plunger shaft 654-6P, and is located at an outlet bore 654-8 in the reservoir 654-4. Actuation of the valve device 654-6 causes the valve plug 654-6V to move, in order to open or close the outlet bore 654-8 and correspondingly increase or decrease a flow area available for shear fluid to pass through. As shown in the illustrated embodiment, the valve plug 654-6V (and the plunger shaft 654-6P) can radially translate relative to the bore 654-8 to open or close/cover the bore 654-8 and thus change a degree of openness of the valve device 654-6. A mechanical biasing element (e.g., spring or magnet) can optionally be provided to urge the valve plug 654-6V to a desired position (such as an open position), which can facilitate a "fail on" configuration even under low speed operation when centrifugal forces are relatively low or when the valve device 654-6 is carried on an output of the clutch mechanism 654. In the illustrated embodiment, the valve plug 654-6V has a graduated configuration, with a generally frusto-conical shape, which can further have a slightly oblong curvature to match a slightly elongated shape formed when the outlet bore 654-8 created by radially drilling through a curved wall of the reservoir 654-4. Further, at least an outer or exterior portion of the valve plug 654-6V can be made of a conformable material, in order to promote sealing and seating against a complementary-shaped graduated perimeter of the outlet bore 654-8 when in a closed position. The valve plug 654-6V can be made of a material capable of dampening vibrations, particularly torsional vibrations when the valve is in a closed positioned, such as by converting kinetic energy from vibrations to heat, though in other embodiments the valve plug 654-6V can be made of a substantially rigid material. For instance, in some embodiments, the valve plug 654-6V can be made of polyether ether ketone (PEEK), which has relatively high temperature and impact tolerances. Structures with sliding components as in the valve device 654-6 can have tolerances that, if vibrations are not dampened, can potentially lead to undesirable internal collisions. Additional or alternative dampening structures can be provided in further embodiments. The valve plug 654-6V can be secured to the plunger shaft 654-6P via a threaded connection, or in any other suitable manner. In the illustrated embodiment, the valve plug 654-6V is located 180° from the linear actuator 654-6L, and opposite the linear actuator 654-6L, relative to the axis A. Further, the outlet bore 654-8 is arranged radially, that is, shear fluid flow through the outlet bore 654-8 out of (or alternatively, into) the reservoir 654-4 occurs in generally the radial direction (relative to the axis A). The needle valve device 654-6 can operate as a proportional valve, in some embodiments, allowing actuation to essentially any degree or percentage of openness between 0-100%, or alternatively can be actuated only between fully open and fully closed positions, such as using a PWM control scheme.

In further embodiments, a bearing and/or guide can further be provided to help reduce friction, to better align the yoke 654-6Y relative to the shaft 654-0, or the like. Moreover, an optional spring or other biasing element can be provided (e.g., within the opening 654-6O) to bias the yoke 654-6Y relative to the shaft 654-0.

During operation, torque input to the clutch mechanism 654 causes the valve device 654-6 to rotate about the axis A (e.g., with the clutch input at a clutch input speed). Centrifugal force acting on the translatable plunger shaft 654-6P, yoke 654-6Y and/or valve plug 654-6V urges those components to move in the radial direction. More particularly, centrifugal forces can urge the valve plug 654-6V radially outward, which in the illustrated embodiment opens or uncovers the outlet bore 654-8. This configuration can provide a "fail on" arrangement, in which the valve device 654-6 is open by default whenever there is a torque input to the clutch mechanism 654, regardless of whether there is electrical power available to the linear actuator 654-6L. The linear actuator 654-6L is selectively controlled, such as by selectively controlling electrical power supplied to the linear actuator 654-6L, to translate the valve plug 654-6V via the plunger shaft 654-6P and the yoke 654-6Y. In the illustrated embodiment, the linear actuator 654-6L translates the valve plug 654-6V radially inward, against centrifugal force acting on the valve plug 654-6V, to move the valve plug 654-6V toward a seat at the outlet bore 654-8 and thereby restricting shear fluid flow. In some embodiments, the valve device 654-6 can further include anti-morning sickness features that, for instance, bias the valve plug 654-6V radially inward to a closed position when the clutch mechanism 654 is at rest (without any torque input).

Figure 10D:
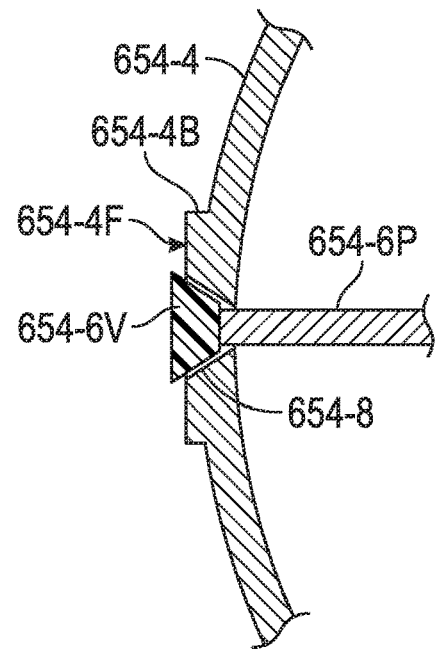
FIG. 10D is a sectional view of an alternate embodiment of a needle valve and reservoir assembly.

FIG. 10D is a sectional view of an alternate embodiment of a valve and reservoir assembly. More specifically, because the shape of a radially-oriented outlet bore through an annular wall of a reservoir has a complex shape in three-dimensional space (as shown in FIG. 10A), the embodiment shown in FIG. 10D adds a boss 654-4B on a wall of the reservoir 654-4 at the outlet bore 654-8. In the illustrated embodiment, the boss 654-4B protrudes radially outward from an outer diameter surface of a generally arcuate wall of the reservoir 654-4 and has a substantially planar face 654-4F, which is arranged to face radially outward, and the outlet bore 654-8 passes through the boss 654-4B. In this way, the substantially planar face 654-4F on the boss 654-4B allows the outlet bore 654-8 to have a relatively simple perimeter shape, such as a purely circular perimeter shape along the substantially planar face 654-4F, which facilitates manufacturability and promotes bettering seating of the valve plug 654-6V when the valve device 654-6 is fully closed, thereby more fully blocking all flow of the shear fluid through the outlet bore 654-8.

Figure 11B:
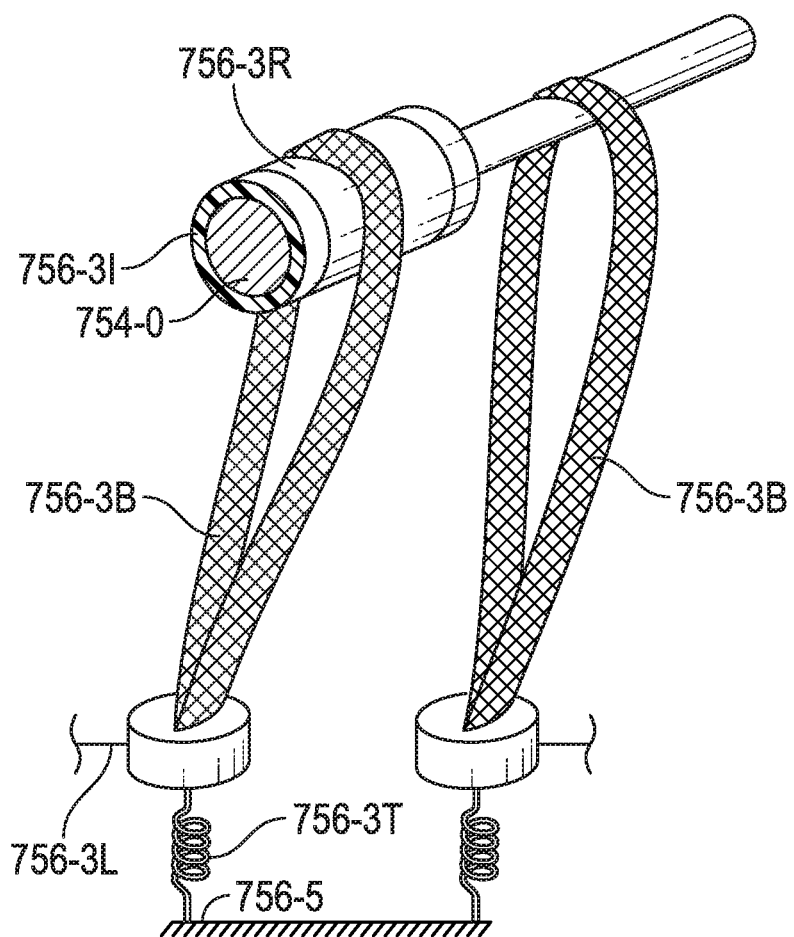
FIG. 11B is a perspective view of a portion of the assembly with the tensioned cable loop rotary electrical interface of FIG. 11A.

FIGS. 11A and 11B illustrate an embodiment of an assembly 752 with a tensioned cable loop rotary electrical interface 756-3 and associated electrical pathways connecting an energy harvester 756 and a clutch mechanism 754. As shown in the illustrated embodiment, braided electrical cables 756-3B are configured as loops that encircle a shaft 754-0 of the clutch mechanism 754. Ends of the loop of each braided electrical cable 756-3B are secured together, such as with a crimp, clamp or the like, and each braided electrical cable 756-3B is electrically connected to a corresponding lead 756-3L that in turn connects to components (not shown in FIGS. 11A and 11B) of the energy harvester 756 that generate and supply electrical power. One braided electrical cable 756-3B contacts a rail (or collector ring) 756-3R that is supported on and rotationally fixed relative to the shaft 754-0, with an electrically insulative sleeve 756-3I electrically isolating the rail 756-3R from the shaft 754-0. The rail 756-3R can be made of aluminum. The other braided electrical cable 756-3B directly contacts the shaft 754-0. As shown in FIG. 11B, a tensioning element (e.g., spring) 756-3T is provided to tension the loop of each braided electrical cable 756-3B relative to the rail 756-3R and/or the shaft 754-0. The tensioning element 756-3T can be directly or indirectly secured to an enclosure 756-5 of the energy harvester 756, such that the braided electrical cables 756-3B are rotationally fixed relative to at least the enclosure of the energy harvester 756 (and typically also rotationally fixed relative to most of the components of the energy harvester 756). Physical contact between the braided electrical cables 756-3B and either the rail 756-3R and the shaft 754-0 allows electrical current and/or signals to be transmitted between them, while at the same time allowing relative rotation between the braided electrical cable 756-3B and both the rail 756-3R and the shaft 754-0. In further embodiments, a clamp, spacer, holder, guide, spring, or the like can be provided to help secure the braided electrical cable 756-3B in a desired position, and/or to help increase a surface area of physical contact between the braided electrical cable 756-3B and the rail 756-3R. It has been found that the illustrated embodiment of the rotary electrical interface 756-3 can help reduce power losses and sparking present when using a slip ring assembly with carbon brushes, and is relatively resilient to noise.

An electrically insulated wire 754-6W, suitable for relatively high temperature operation, can be electrically connected to the rail 756-3R and extend through a passageway 754-9 in the shaft 754-0. The wire 754-6W allows electrical current transmitted across a rotary joint of the rotary electrical interface 756-3 to be carried through the clutch mechanism 754 to desired locations, such as to an electrically-powered actuation device (e.g., valve).

Although FIGS. 11A and 11B illustrate only two braided electrical cables 756-3B and one associated rail 756-3R, in further embodiments additional braided electrical cables and/or rails can be provided to provide additional, electrically isolated conductor paths through the rotary electrical interface 756-3.

The shaft 754-0 can be made of an electrically conductive material, and can function as a ground or negative path. The ground or negative path can continue from the shaft 754-0 to a prime mover (see, e.g., FIGS. 1 and 2). In this way, the number of rails 754-3R can be kept small, while still providing multiple electrical pathways to form a circuit within the clutch mechanism 754. Alternatively, different conductive paths can be provided through different types of rotary electrical interface elements in further embodiments.

The present invention also includes methods of making and using an electromagnetic energy harvesting device, and of making and using a clutch system including such an energy harvesting device. Additionally, the present invention includes methods of making and using an electrically-actuated viscous clutch wirelessly controlled by an external controller, such methods further including powering the electrically-controlled clutch with locally harvested or scavenged energy present at or near the clutch. Embodiments of these methods can generally include harvesting available energy E with an energy harvester located adjacent to or within a clutch mechanism (e.g., a viscous clutch mechanism), with the energy harvester generating electricity that is then transmitted to an electrically-powered clutch actuating mechanism (e.g., valve device(s)) used to control engagement of the clutch mechanism. The electricity generated by the energy harvester can be transmitted across a rotatable electrical interface (e.g., collector ring or the like) before reaching the electrically-powered clutch actuation device, which can be carried by a rotatable component of the clutch mechanism (e.g., though an input of the clutch mechanism) and thus can rotate (e.g., rotate relative to the energy harvester, which can be substantially rotationally stationary) when there is a torque input to the clutch mechanism. Moreover, the electricity generated by the energy harvester can be temporarily stored in a storage device (e.g., battery), and can be conditioned and/or processed by suitable components such as a power conditioner and/or a control circuit. Additionally, wireless signals (e.g., control signals, sensor data, or the like) can be transmitted and/or received using a transceiver powered by electricity generated by the energy harvester. Such a transceiver can be carried by or with the energy harvester, or alternatively by or with the clutch mechanism. Control signals from an external control unit received by the transceiver can be used to control operation of the clutch actuating mechanism (e.g., the state of a valve that regulates shear fluid flow in a viscous clutch as a function of electrical power supplied to the valve based on the wireless control signal(s)). In some embodiments, the actuating mechanism can be maintained in a stable position (e.g., a valve can be maintained in a position that maintains a given degree of fluid flow) when the actuating mechanism is electrically unpowered. Embodiments of these methods can utilize systems and assemblies like those discussed above, or systems and assemblies with different configurations. Persons of ordinary skill in the art will recognize other aspects of disclosed methods contemplated by the present invention in view of the entirety of the present disclosure, including the accompanying figures.

Discussion of Possible Embodiments A clutch assembly can include a clutch mechanism having an input member, an output member, and an actuating mechanism to govern selective torque transmission from the input member to the output member, with the actuating mechanism powered by electrical current; and an energy harvesting device electrically connected to the actuating mechanism. The energy harvesting device can be configured to scavenge available energy to generate the electrical current that powers the actuating mechanism.

The clutch assembly of the preceding paragraph can optionally include, additionally and/or alternatively, any one or more of the following features, configurations and/or additional components:

a rotary electrical interface electrically connected between the energy harvesting device and the actuating mechanism, with the rotary electrical interface permitting the actuating mechanism to rotate relative to the energy harvesting device;

the clutch mechanism can be configured as a viscous clutch having a working chamber and a reservoir, the actuating mechanism can be a valve assembly that governs flow of a shear fluid between the reservoir and the working chamber, with the valve assembly regulating a volume of the shear fluid present in the working chamber to controllably transmit torque from the input member to the output member;

the actuating mechanism can be configured to be positionally stable when unpowered;

the energy harvesting device can be carried by the clutch mechanism;

the energy harvesting device can be rotatably mounting on a shaft of the clutch mechanism;

the energy harvesting device can have an asymmetrically mass distribution to resist rotation;

the energy harvesting device can comprise a vibrational energy harvesting element;

the vibrational energy harvesting element can include a cantilevered piezoelectric beam;

the piezoelectric beam can include a tuned mass;

an additional energy harvesting element electrically connected to the actuating mechanism;

the additional energy harvesting element can be a vibrational energy harvesting element;

the energy harvesting device can include an energy harvesting element, a power conditioner electrically connected to the energy harvesting element, a battery electrically connected to the power conditioner, and/or a control circuit electrically connected to the battery;

a wireless transceiver powered by the electrical current generated by the energy harvesting device;

the energy harvesting device can have no wired electrical connection external to the clutch assembly;

the actuating mechanism can be rotatable relative to the energy harvesting device;

the actuating mechanism can be configured to rotate with at least one of the input member or the output member during operation;

the clutch mechanism can be configured as a viscous clutch mechanism having a reservoir with a bore, and the actuating mechanism can be a valve assembly with an electromagnetic coil rotationally fixed relative to the reservoir, a magnetic flux guide adjoining the electromagnetic coil and rotationally fixed relative to the reservoir and the electromagnetic coil, an armature positioned adjacent to the electromagnetic coil positioned such that a magnetic field generated by the electromagnetic coil directly acts upon the armature to move the armature, and a reed valve positioned adjacent to the armature, such that movement of the armature pivots the reed valve relative to the bore of the reservoir;

the reservoir can further include a reservoir plate, and the electromagnetic coil and the magnetic flux guide can both be located on one side of the reservoir plate and the armature and the reed valve can both be located on an opposite side of the reservoir plate;

a magnetic flux circuit can pass from the electromagnetic coil to the armature, then to a shaft of the viscous clutch mechanism that is rotationally fixed relative to the reservoir, then to the magnetic flux guide, and then back to the electromagnetic coil, in which the magnetic flux circuit is contained entirely inside the viscous clutch mechanism;

the magnetic flux circuit can be asymmetrical relative to an axis of rotation of the viscous clutch mechanism;

the bore of the reservoir can be oriented substantially axially;

the reed valve can be axially pivotable;

the clutch mechanism can be configured as a viscous clutch mechanism having a reservoir with a bore, and the actuating mechanism can be a valve assembly with a linear actuator rotationally fixed relative to the reservoir, and a needle assembly including a plunger and a valve plug, with the plunger operatively engaged to the linear actuator, the valve plug carried by the plunger such that actuation of the linear actuator translates the plunger and the valve plug, with the valve plug being selectively movable relative to the bore of the reservoir;

the plunger and the valve plug can be arranged to translate radially in response to actuation of the linear actuator;

the valve plug can be located 180° from the linear actuator at an opposite side of an axis of rotation of the viscous clutch mechanism;

the needle assembly can further include a yoke having an opening, with actuation of the linear actuator translating the yoke with the plunger and the valve plug;

a shaft of the viscous clutch mechanism can pass through the opening in the yoke;

the linear actuator can include a solenoid, and magnetic flux generated by the solenoid from electrical power from the energy harvesting device can be contained within the linear actuator at a discrete circumferential location radially spaced from an axis of rotation of the viscous clutch mechanism;

a tensioned loop of electrically conductive material positioned around a shaft of the clutch mechanism to form a rotary electrical interface electrically connected between the energy harvesting device and the actuating mechanism;

the tensioned loop can include a braided cable;

a rotor disk;

a housing;

the housing can be configured as either the input member or the output member and the rotor disk can be configured as the other of the input member or the output member; and/or the actuating mechanism can be located entirely inside the housing.

A vehicle includes a fan, an engine, and the clutch assembly, with the engine providing a torque input to the clutch assembly, and with the fan arranged to accept a torque output of the clutch assembly.

A method of using a clutch to selectively transfer torque includes: scavenging available energy to generate electrical power; transmitting the electrical power across a rotary electrical interface; transmitting the electrical power though a rotatable portion of the clutch to an actuating mechanism of the clutch; and activating the actuating mechanism to control torque transfer between an input and an output of the clutch. The available energy is scavenged by an energy harvester located adjacent to the clutch, and the actuating mechanism is electrically powered by the scavenged electrical power.

The method of the preceding paragraph can optionally include, additionally and/or alternatively, any one or more of the following features, configurations and/or additional steps:

receiving a wireless control signal with a transceiver that is electrically powered by the scavenged electrical power;

controlling the actuating mechanism as a function of the received wireless control signal;

configuring the clutch is as a viscous clutch;

activating the actuating mechanism to control torque transfer between the input and the output of the clutch can include activating a valve to regulate a flow of a shear fluid between a storage reservoir and a working chamber that is operatively positioned between the input and the output of the clutch;

storing the electrical power prior to transmitting the electrical power to the actuating mechanism of the clutch;

scavenging available energy to generate electrical power can include converting vibrational energy to electrical energy;

maintaining the actuation mechanism in a stable position when unpowered; and/or rotating the actuating mechanism relative to the energy harvester, when the actuating mechanism is rotationally fixed to either the input or output of the clutch, and when the actuating mechanism rotates at either an input speed of the input or an output speed of the output.

A valve assembly for a viscous clutch mechanism having a reservoir with a bore, the reservoir being rotationally fixed to an input of the viscous clutch mechanism to rotate at all times with the input about an axis of rotation whenever there is torque input to the viscous clutch mechanism. The valve assembly can include a linear actuator rotationally fixed relative to the reservoir and configured to rotate about the axis of rotation whenever there is torque input to the viscous clutch mechanism, the linear actuator being electrically powered by electrical current transmitted through the input of the viscous clutch mechanism, and a needle assembly including a plunger and a valve plug, the plunger operatively engaged to the linear actuator and the valve plug carried by the plunger such that actuation of the linear actuator translates the plunger and the valve plug. The valve plug is selectively movable relative to the bore of the reservoir to regulate flow of shear fluid through the bore.

The valve assembly of the preceding paragraph can optionally include, additionally and/or alternatively, any one or more of the following features, configurations and/or additional components:

the plunger and the valve plug can be arranged to translate radially in response to actuation of the linear actuator;

the needle assembly can be urged to an open position by default;

the valve plug can be located 180° from the linear actuator at an opposite side of the axis of rotation;

the needle assembly can further include a yoke having an opening, and actuation of the linear actuator translates the yoke with the plunger and the valve plug;

the opening in the yoke can have an obround shape; and/or the linear actuator can include a solenoid, and magnetic flux generated by the solenoid from the electrical current can be contained within the linear actuator at a discrete circumferential location radially spaced from the axis of rotation.

A valve assembly for a viscous clutch mechanism having a reservoir with a bore, the reservoir being rotationally fixed to an input of the viscous clutch mechanism to rotate at all times with the input about an axis of rotation whenever there is torque input to the viscous clutch mechanism. The valve assembly can include an electromagnetic coil rotationally fixed relative to the reservoir and configured to rotate about the axis of rotation whenever there is torque input to the viscous clutch mechanism, the electromagnetic coil being electrically powered by electrical current transmitted through the input of the viscous clutch mechanism, a magnetic flux guide adjoining the electromagnetic coil and rotationally fixed relative to the reservoir and the electromagnetic coil, an armature positioned adjacent to the electromagnetic coil, the armature positioned such that a magnetic field generated by the electromagnetic coil directly acts upon the armature to move the armature, and a reed valve positioned adjacent to the armature. Movement of the armature pivots the reed valve relative to the bore of the reservoir.

The valve assembly of the preceding paragraph can optionally include, additionally and/or alternatively, any one or more of the following features, configurations and/or additional components:

the reservoir can further include a reservoir plate, and the electromagnetic coil and the magnetic flux guide can both be located on one side of the reservoir plate and the armature and the reed valve can both be located on an opposite side of the reservoir plate;

a magnetic flux circuit can pass from the electromagnetic coil to the armature, then to a shaft of the viscous clutch mechanism that is rotationally fixed relative to the reservoir, then to the magnetic flux guide, and then back to the electromagnetic coil;

the magnetic flux circuit can be circumferentially asymmetrical relative to the axis of rotation;

a magnetic flux circuit that links the electromagnetic coil, the armature, and the magnetic flux guide can form a radially-extending loop at a discrete circumferential location relative to the axis of rotation;

the bore of the reservoir can be oriented substantially axially;

the reed valve can be axially pivotable;

the reed valve can be spring biased away from the bore by default; and/or the armature can be configured to pivot the reed valve toward the bore when the electromagnetic coil is energized.

A method of actuating a viscous clutch mechanism having an axis of rotation, an input and an output can include rotating a valve device relative to the axis of rotation, where the valve device is rotationally fixed to either the input or the output, and where the valve device rotates at either an input speed of the input or an output speed of the output during operation of the viscous clutch mechanism, transmitting electrical current though either the input or the output to the valve device, and actuating the valve device to control flow of a shear fluid within the viscous clutch mechanism to in turn control torque transfer between the input and the output.

The method of the preceding paragraph can optionally include, additionally and/or alternatively, any one or more of the following features, configurations and/or additional steps:

actuating the valve device can include generating magnetic flux with an electromagnetic coil of the valve device; transmitting the magnetic flux along a flux circuit, comprising the steps of passing the magnetic flux from the electromagnetic coil to an armature positioned adjacent to the electromagnetic coil, passing the magnetic flux from the armature to a shaft, passing the magnetic flux from the shaft to a magnetic flux guide, and passing the magnetic flux from the magnetic flux guide to the electromagnetic coil; and moving a reed valve positioned adjacent to the armature, where movement of the armature moves the reed valve relative to a bore through which the shear fluid can flow within the viscous clutch mechanism;

transmitting the magnetic flux along a flux circuit can include transmitting the magnetic flux in a loop that extends radially relative to the axis of rotation at a discrete circumferential location;

transmitting the magnetic flux along a flux circuit can include passing the magnetic flux axially across a reservoir plate;

moving the reed valve can include moving the armature to apply an axial force against the reed valve, and axially pivoting the reed valve in response to the axial force;

actuating the valve device can include actuating a linear actuator of the valve device, and translating a needle assembly that includes a plunger and a valve plug, where the needle assembly is translated by the linear actuator;

the needle assembly can be translated radially by the linear actuator;

urging the needle assembly to an open position at least during operation of the viscous clutch mechanism;

mechanical force generated by actuation of the linear actuator can transmitted radially across the axis of rotation to the valve plug;

mechanical force generated by actuation of the linear actuator can be transmitted radially across an axially-extending shaft of the viscous clutch mechanism;

the linear actuator can be a solenoid actuator;

magnetic flux generated with an electromagnetic coil of the solenoid actuator can be substantially contained within the linear actuator at a discrete circumferential location radially spaced from the axis of rotation;

scavenging available energy to generate electrical current, the available energy being scavenged by an energy harvester located adjacent to the viscous clutch mechanism;

transmitting the electrical power across a rotary electrical interface to the valve device;

storing the electrical power prior to transmitting the electrical current to the valve device;

scavenging available energy to generate electrical power can include converting vibrational energy to electrical energy;

transmitting the electrical power across the rotary electrical interface to the valve device can include transmitting the electrical power through a tensioned loop that physically contacts an electrically conductive rail; and/or maintaining a degree of openness of the valve device in a stable position when unpowered.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, transitory signal fluctuations, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention. For example, features, steps or other elements described with respect to one embodiment can be used with other disclosed embodiments.

The invention claimed is:

1. A clutch assembly comprising:
   a clutch mechanism having an input member, an output member, and an actuating mechanism to govern selective torque transmission from the input member to the output member, wherein the actuating mechanism is powered by electrical current; and
   a vibrational energy harvesting device electrically connected to the actuating mechanism, wherein the vibrational energy harvesting device is configured to scavenge available vibrational energy to generate the electrical current that powers the actuating mechanism.

2. The clutch assembly of claim 1 and further comprising:
   a rotary electrical interface electrically connected between the vibrational energy harvesting device and the actuating mechanism, wherein the rotary electrical interface permits the actuating mechanism to rotate relative to the vibrational energy harvesting device.

3. The clutch assembly of claim 1, wherein the clutch mechanism is configured as a viscous clutch having a working chamber and a reservoir, wherein the actuating mechanism comprises a valve assembly that governs flow of a shear fluid between the reservoir and the working chamber, and wherein the valve assembly regulates a volume of the shear fluid present in the working chamber to controllably transmit torque from the input member to the output member.

4. The clutch assembly of claim 1, wherein the actuating mechanism is configured to be positionally stable when unpowered.

5. The clutch assembly of claim 1, wherein the vibrational energy harvesting device is rotatably mounted on a shaft of the clutch mechanism, and wherein the vibrational energy harvesting device has an asymmetrical mass distribution to resist rotation.

6. The clutch assembly of claim 1, wherein the vibrational energy harvesting device comprises a vibrational energy harvesting element.

7. The clutch assembly of claim 6, wherein the vibrational energy harvesting element comprises a cantilevered piezoelectric beam.

8. The clutch assembly of claim 6 and further comprising:
an additional energy harvesting element electrically connected to the actuating mechanism.

9. The clutch assembly of claim 1, wherein the vibrational energy harvesting device includes:
a vibrational energy harvesting element;
a power conditioner electrically connected to the vibrational energy harvesting element;
a battery electrically connected to the power conditioner; and
a control circuit electrically connected to the battery.

10. The clutch assembly of claim 1 and further comprising:
a wireless transceiver powered by the electrical current generated by the vibrational energy harvesting device.

11. The clutch assembly of claim 1, wherein the vibrational energy harvesting device has no wired electrical connection external to the clutch assembly.

12. The clutch assembly of claim 1, wherein the actuating mechanism is rotatable relative to the vibrational energy harvesting device, and wherein the actuating mechanism is configured to rotate with at least one of the input member or the output member during operation.

13. The clutch assembly of claim 1, wherein the clutch mechanism is configured as a viscous clutch mechanism having a reservoir with a bore, and wherein the actuating mechanism is a valve assembly comprising:
an electromagnetic coil rotationally fixed relative to the reservoir;
a magnetic flux guide adjoining the electromagnetic coil and rotationally fixed relative to the reservoir and the electromagnetic coil;
an armature positioned adjacent to the electromagnetic coil, wherein the armature is positioned such that a magnetic field generated by the electromagnetic coil directly acts upon the armature to move the armature; and
a reed valve positioned adjacent to the armature, wherein movement of the armature pivots the reed valve relative to the bore of the reservoir.

14. The clutch assembly of claim 13, wherein a magnetic flux circuit passes from the electromagnetic coil to the armature, then to a shaft of the viscous clutch mechanism that is rotationally fixed relative to the reservoir, then to the magnetic flux guide, and then back to the electromagnetic coil, wherein the magnetic flux circuit is contained entirely inside the viscous clutch mechanism, and wherein the magnetic flux circuit is asymmetrical relative to an axis of rotation of the viscous clutch mechanism.

15. The clutch assembly of claim 1, wherein the clutch mechanism is configured as a viscous clutch mechanism having a reservoir with a bore, and wherein the actuating mechanism is a valve assembly comprising:
a linear actuator rotationally fixed relative to the reservoir; and
a needle assembly including a plunger and a valve plug, wherein the plunger is operatively engaged to the linear actuator, wherein the valve plug is carried by the plunger, such that actuation of the linear actuator translates the plunger and the valve plug, and wherein the valve plug is selectively movable relative to the bore of the reservoir.

16. The clutch assembly of claim 15, wherein the plunger and the valve plug are arranged to translate radially in response to actuation of the linear actuator.

17. The clutch assembly of claim 15, the needle assembly further comprising:
a yoke having an opening, wherein a shaft of the viscous clutch mechanism passes through the opening in the yoke, and wherein actuation of the linear actuator translates the yoke with the plunger and the valve plug.

18. The clutch assembly of claim 15, wherein the linear actuator comprises a solenoid, and wherein magnetic flux generated by the solenoid from electrical power from the vibrational energy harvesting device is contained within the linear actuator at a discrete circumferential location radially spaced from an axis of rotation of the viscous clutch mechanism.

19. The clutch assembly of claim 1 and further comprising:
a tensioned loop of electrically conductive material positioned around a shaft of the clutch mechanism to form a rotary electrical interface electrically connected between the vibrational energy harvesting device and the actuating mechanism.

20. The clutch assembly of claim 1 and further comprising:
a rotor disk; and
a housing, wherein the housing is configured as either the input member or the output member and the rotor disk is configured as the other of the input member or the output member, and wherein the actuating mechanism is located entirely inside the housing.

21. A method of using a clutch to selectively transfer torque, the method comprising:
scavenging available vibrational energy to generate electrical power, wherein the available vibrational energy is scavenged by a vibrational energy harvester located adjacent to the clutch;
transmitting the scavenged electrical power across a rotary electrical interface;
transmitting the scavenged electrical power though a rotatable portion of the clutch to an actuating mechanism of the clutch;
rotating the actuating mechanism relative to the vibrational energy harvester, wherein the actuating mechanism is rotationally fixed to either the input or output of the clutch, and wherein the actuating mechanism rotates at either an input speed of the input or an output speed of the output; and
activating the actuating mechanism to control torque transfer between an input and an output of the clutch, wherein the actuating mechanism is electrically powered by the scavenged electrical power.

22. The method of claim 21 further comprising:
maintaining the actuation mechanism in a stable position when unpowered.

* * * * *